(12) United States Patent
Ruhe

(10) Patent No.: US 8,006,222 B2
(45) Date of Patent: Aug. 23, 2011

(54) RELEASE PLANNING

(75) Inventor: Guenther H. Ruhe, Calgary (CA)

(73) Assignee: Guenther H. Ruhe, Edmonton Alberta (CA)

( * ) Notice: Subject to any disclaimer, the term of this patent is extended or adjusted under 35 U.S.C. 154(b) by 1204 days.

(21) Appl. No.: 10/807,465

(22) Filed: Mar. 24, 2004

(65) Prior Publication Data

US 2005/0216879 A1 Sep. 29, 2005

(51) Int. Cl.
*G06F 9/44* (2006.01)
*G06F 11/00* (2006.01)

(52) U.S. Cl. ............................. 717/101; 717/120; 705/12

(58) Field of Classification Search ........... 717/101–103
See application file for complete search history.

(56) References Cited

U.S. PATENT DOCUMENTS

| | | | |
|---|---|---|---|
| 2002/0091988 A1 | 7/2002 | Murphy | 717/101 |
| 2002/0104068 A1 | 8/2002 | Barrett et al. | 717/104 |
| 2002/0170042 A1 | 11/2002 | Do et al. | 717/143 |
| 2004/0003369 A1 | 1/2004 | Gonos | 717/100 |
| 2005/0114829 A1* | 5/2005 | Robin et al. | 717/101 |

OTHER PUBLICATIONS

Ruhe et al., Quantitative Studies in Software Release Planning under Risk Resource Constraints, Sep. 2003, IEEE, pp. 1-10.*
Greer et al., Software Release Planning: an evolutionary and iterative approach, Jul. 2003, Elsevier, pp. 243-253.*
Li et al., Web-Based Decision Support for Software Release Planning, Oct. 2003, WSS 2003, pp. 13-20.*
Carlshamre et al., "An Industrial Survey of Requirements Interdependencies in Software Product Release Planning", 2001, IEEE, pp. 84-91.*
Antoniol et al., "Search-Based Techniques for Optimizing Software Project Resource Allocation", Jan. 19, 2004, GECCO, pp. 1-11.*
David A. Penny, "An Estimation-Based Management Framework for Enhancive Maintenance in Commercial Software Products", 2002, IEEE, pp. 1-9.*
Pär Carlshamre, "Release Planning in Market-Driven Software Product Development: Provoking an Understanding", 2002, Springer-Verlag London Limited, pp. 139-151.*
Harman et al., "Search-based Software Engineering", 2001, Elsevier Science B.V., pp. 833-839.*
Lu et al., "Framework and Implementation of a Web-based Multi-objective Decision Support System: WMODSS", WSS03—Applications, Products and Services of Web-based Support Systems, WSS 2003, Halifax, Canada, Oct. 13, 2003, pp. 7-11.*
Sönke Hartman, "A Self-Adapting Genetic Algorithm for Project Scheduling under Resource Constraints", John Wiley & Sons, Inc., pp. 1-16.*
Günther Ruhe, "Software Release Planning", Handbook Software Engineering and Knowledge Engineering—vol. 3, pp. 1-21.*

(Continued)

*Primary Examiner* — Tuan Q Dam
*Assistant Examiner* — Ben C Wang
(74) *Attorney, Agent, or Firm* — Anthony R. Lambert

(57) ABSTRACT

A method of software release planning. The method comprises the steps of assigning stakeholder priorities to a set of requirements for software; explicitly defining a set of constraints on the requirements; and operating on the stakeholder priorities with algorithms using a computer, subject to the constraints, to generate at least one release plan solution. Priorities are balanced between priorities of multiple stakeholders, and between the impact of various release plan solutions on project time, overall benefit, and quality of the software. A set of near optimal and maximally distinct solutions is generated.

14 Claims, 14 Drawing Sheets

OTHER PUBLICATIONS

Aurum et al., "The fundamental nature of requirements engineering activities as a a decision-making process", Information and Software Technology, Nov. 1, 2003, Elsevier, vol. 45, Issue 14, pp. 945-954.*

Carlshamre, P., Sandahl, K., Lindvall, M., Regnell, B., Natt och Dag, J., "An Industrial Survey of Requirements Interdependencies in Software Product Release Planning", *IEEE*, p. 84-91.

Jung, Ho-Won, "Optimizing Value and Cost in Requirements Analysis", *IEEE Software*, Jul./Aug. 1998, pp. 74-78.

DeGregorio, G., "Enterprise-wide Requirements & Decision Management", *Ninth Annual Int'l Symposium of the Int'l Council on System Engineering*, Brighton, England, Jun. 6-10, 1999, 7 pages.

Karlsson, L., Dahlstedt, Å.G., Natt och Dag, J., Regnell, B., Persson, A., "Challenges in Market-Driven Requirements Engineering—an Industrial Interview Study", *Proceedings of REFSQ '02* Sep. 9-10, 2002, Essen, Germany, 13 pages.

"What are Your Requirements? 2003" The Standish Group, http://www.standishgroup.com/, 2002, 4 pages.

Ruhe, G., Greer, D., "Quantitative Studies in Software Release Planning under Risk and Resource Constraints". *Proceedings of the 2003 IEEE International Symposium on Empirical Software Engineering*, 2003, pp. 262-271.

Ruhe, G., Ngo-The, A., "Hybrid Intelligence in Software Release Planning". *IJHS*, vol. 1, 2004, 13 pages.

Greer, D and Ruhe, G., "Software Release Planning: An Evolutionary and Iterative Approach". *Information and Software Technology*, 2004, 19 pages.

* cited by examiner

| | | | | | FV: 50 | P: 0.2 |
|---|---|---|---|---|---|---|
| 2 | 3 | 4 | 5 | 1 | FV: 45 | P: 0.15 |
| 1 | 2 | 3 | 4 | 5 | FV: 30 | P: 0.15 |
| 5 | 2 | 4 | 3 | 1 | FV: 25 | P: 0.10 |
| 4 | 2 | 3 | 1 | 5 | | |

...

| 4 | 1 | 3 | 2 | 5 | FV: -3 | P: 0.05 |
|---|---|---|---|---|---|---|

FIG. 7

RELEASE PLANNING

BACKGROUND OF THE INVENTION

Requirements management in general is concerned with the control of system requirements that are allocated to software to resolve issues before they are incorporated into the software project. It aims to accurately adjust plans and cost estimates as the requirements change, and to prioritize requirements according to their importance and their contribution to the final value of the product. There is very good reason to significantly improve the maturity of these processes. According to the Standish Research Group ("What are your requirements?" http://www.standishgroup.com/, 2002), the three leading causes of quality and delivery problems in software projects are related to requirements management issues: Lack of adequate user input, incomplete requirements and specifications, and changing requirements specifications.

A software release is a collection of new and/or changed features or requirements that form a new product. Release planning for incremental software development assigns features to releases such that most important technical, resource, risk and budget constraints are met. Without good release planning 'critical' features are jammed into the release late in the cycle without removing features or adjusting dates. This might result in unsatisfied customers, time and budget overruns, and a loss in market share, as indicated by Penny D., "An Estimation-Based Management Framework for Enhancive Maintenance in Commercial Software Products", in Proc. International Conference on Software Maintenance, 2002. "Developing and releasing small increments of requirements, in order for customers to give feedback early, is a good way of finding out exactly what customers want, while assigning a low development effort" as stated in Carlshamre, P., "Release Planning in Market-Driven Software Product Development: Provoking an Understanding". In: Requirements Engineering 7, pp 139-151, 2002.

There is a growing recognition that features act as an important organizing concept within the problem domain and as a communication mechanism between users and developers. They provide an efficient way to manage the complexity and size of requirements.

The concept of a feature is applicable and important for any software development paradigm. However, it is especially important for any type of incremental product development. Features are the "selling units" provided to the customer. Incremental development has many advantages over the traditional waterfall approach. First, prioritization of features ensures that the most important features are delivered first. This implies that benefits of the new system are realized earlier. Consequently, less important features are left until later and so, if the time or budget is not sufficient, the least important features are the ones most likely to be omitted. Second, customers receive an early version of the system and so are more likely to support the system and to provide feedback on it. Third, the schedule and cost for each delivery stage are easier to estimate due to smaller system size. This facilitates project management and control. Fourth, user feedback can be obtained at each stage and plans can be adjusted accordingly. Fifth, an incremental approach is sensitive to changes or additions to features.

Agile methods as described in Cockburn, A., "Agile Software Development", Pearson Education, 2002, have capitalized on the above advantages. In Extreme Programming (Beck, K. "Extreme Programming Explained", Addison Wesley, 2001), a software product is first described in terms of 'user stories'. These are informal descriptions of user requirements. In the planning process, these stories are prioritized using the perceived value to the user and assigned to releases. Based on estimates of how long each story in an increment will take to implement, an iteration plan is developed for delivering that release. Each increment (or release) is a completed product of use to the customer. At any time, new stories may be added and incorporated into future releases.

The requirements engineering process is a decision-rich problem solving activity (Aurum, A., Wohlin, C., "The Fundamental Nature of Requirement Engineering Activities as a Decision-Making Process", Information and Software Technology 2003, Vol. 45 (2003), No. 14, pp. 945-954.) One of the most prominent issues involved in incremental software development is to decide upon the most promising software release plans while taking into account diverse qualitative and quantitative project data. This is called release planning. The input for the release planning process is a set of features that are evolving due to changing user requirements and better problem understanding. Despite the obvious importance of the problem in current incremental and evolutionary development, it is poorly studied in the literature.

Release planning considers stakeholder priorities and different types of constraints. The output of the release planning process is a set of candidate assignments of features to increments. They are supposed to represent a good balance between stakeholder priorities and the shortage of resources. In each increment, all the features are executed following one of the existing software development paradigms including analysis, system design, detailed design, implementation, component testing, system testing, and user testing. All the features are inputted into this process. As a result, a usable (release) product is provided. This fundamental procedure of planning and development of releases is illustrated in FIG. 2. Release planning assigns features to release options 1 (dark grey), 2 (grey) or 3 (white). Within each release development cycles, all features are passing the stages of a software development cycle. This cycle includes verification and validation activities at the different product stages (requirement, system design, component design, code). At the end of this process, a verified and validated release product is delivered. This principle can be easily extended to planning of more than two releases ahead.

Without any technological, resource, risk and financial constraints, all the features could be implemented in one release. However, the existence of all the constraints implies the questions: what comes first and why? The goal of release planning is to account for all these factors and to come up with suggestions for the most satisfactory release plans. There are two fundamental types of release planning problems: (i) release planning with fixed and pre-determined time interval for implementation, and (ii) planning with flexible intervals. In the second problem, you also decide about the length of the interval to implement all the assigned features. This type of planning is also called 'Open scope release planning'.

Software Release Planning adds to two well-established disciplines of (incremental) software development: (i) requirements management, especially requirements prioritization, and (ii) software project planning and management. Defining the commonalities and differences between them helps to better understand release planning. Requirements management is the process of identifying, documenting, communicating, tracking and managing project requirements as well as changes to those requirements. As requirements are changing, or are becoming better understood, or new requirements are arising, requirements management is an ongoing activity.

Requirements prioritization is trying to determine the different degrees of priority. The problem of still delivering a large amount of features that are never used, and vice versa, not delivering those that are required, has (among others) to do with a lack of understanding and prioritization. As a feature has different relevant attributes (such as its functionality, inherent risk, effort of implementation) that contribute to the final judgement, requirements prioritization is a multi-attributive decision problem. Practically, most emphasis is on the provided functionality of the feature. Specifically, requirements prioritization is also a multi-person (multi-criteria) decision problem, as the prioritization is typically performed in a team-session. There is no clear description on how the different and conflicting opinions are actually negotiated.

Release planning may be characterized as "wicked". That means that the objective is "to maximize the benefit", but it is difficult to give a measurable definition of "benefit". Wicked problems have no stopping rule in its solution procedure. The underlying model is "evolving": the more we study the problem, the more sophisticated the model becomes. Wicked problems have better or worse solutions, but no optimal one. Although we are approximating the reality, implicit and tacit judgment and knowledge will always influence the actual decisions. As a consequence of all these difficulties, we propose to rely on the synergy between computational strength and the experience and intelligence of the human decision maker as proposed by the paradigm of software engineering decision support.

Release planning is a very complex problem including different stakeholder perspectives, competing objectives and different types of constraints. Release planning is impacted by a huge number of inherent constraints. Most of the features are not independent from each other. Typically, there are precedence and/or coupling constraints between them that have to be satisfied. Furthermore, effort, resource, and budget constraints have to be fulfilled for each release. The overall goal is to find a relatively small set of "most promising" release plans such that the overall value and the degree of satisfaction of all the different stakeholders are maximized. The topic of investigation is uncertain and incomplete in its nature:

Features are not well specified and understood: There is usually no formal way to describe the features and requirements. Non-standard format of feature specification often leads to incomplete descriptions and makes it harder for stakeholders to properly understand and evaluate features and requirements.

Stakeholder involvement: In most cases, stakeholders are not sufficiently involved in the planning process. This is especially true for the final users of the system. Often, stakeholders are unsure why certain plans were suggested. In the case of conflicting priorities, knowing the details of compromises and why they were made would be useful. All these issues add to the complexity of the problem at hand and if not handled properly, they create a huge possibility for project failures Change of features and requirements and other problem parameters: Features and requirements always change as the project progresses. If a large number of features increase the complexity of the project, their dynamic nature can pose another challenge. Other parameters such as the number of stakeholders, their priorities, etc., also change with time—adding to the overall complexity.

Size and complexity of the problem: Size and complexity are major problems for project managers when choosing release plans—some projects may have hundreds or even thousands of features. The size and complexity of the problem (known to be NP-complete), and the tendency for not involving all of the contributing factors, makes the problem prohibitively difficult to solve by individual judgment or trial and error type methods.

Uncertainty of data: Meaningful data for release planning are hard to gather and/or uncertain. Specifically, estimates of the available effort, dependencies of features, and definition of preferences from the perspective of involved stakeholders are difficult to gauge.

Availability of data: Different types of information are necessary for actually conducting release planning. Some of the required data are available from other information sources within the organization. Ideally, release planning is incorporated into existing Enterprise Resource Planning or other organizational information systems.

Constraints: A project manager has to consider various constraints while allocating the features and requirements to various releases. Most frequently, these constraints are related to resources, schedule, budget or effort.

Unclear objectives: 'Good' release plans are hard to define at the beginning. There are competing objectives such as cost and benefit, time and quality, and it is unclear which target level should be achieved.

Efficiency and effectiveness of release planning: Release plans have to be updated frequently due to changing project and organizational parameters. Ad hoc methods help determine solutions but are far behind objective demands.

Tool support: Currently, only general-purpose tools for features management are available. Most of them do not focus on the characteristics of release planning.

Solution Methods and Techniques

Prioritization in general answers the questions to classify objects according to their importance. This does not necessarily imply a complete ranking of all objects, but at least an assignment to classes like 'Extremely important', 'important', or 'of moderate importance'. Different scales are applicable according to the underlying degree of knowledge you have about the objects. Prioritization always assumes one or a collection of criteria to actually perform the process.

In Karlsson, J., Wohlin, C and Regnell, B., "An Evaluation of Methods for Prioritising Software Requirements", Information and Software Technology 39 (1998), pp 939-947, a requirements prioritization session is characterized by three consecutive stages:

Preparation: Structuring of the requirements according to the principles of the method to be applied. Provide all information available.

Execution: Agreement on criteria between all team members. Decision makers do the actual prioritization with all the information available. In general, this step needs negotiation and re-iteration.

Presentation: Final presentation of results to those involved in the process.

There are a number of existing approaches to requirements prioritization. The most important ones have been studied and compared in Karlsson et al. (referenced above). Among them are the analytic hierarchy process (AHP), binary search tree creation, greedy-type algorithms and other sorting-based methods. As a result of their evaluation, they have found out that AHP is the most promising approach. Most of those algorithms need $O(n^2)$ comparisons between the n requirements. This effort required soon becomes prohibitive for larger number of requirements. In addition to that, none of the mentioned algorithms takes into account different stakeholder perspectives.

The Analytic Hierarchy Process (AHP) is a systematic approach to elicit implicit preferences between different involved attributes, as discussed in Saaty T. L.: The Analytic Hierarchy Process, Wiley, New York, 1980. For the purpose of this investigation, AHP is applied to determine the importance of the various stakeholders from a business perspective. In addition, it is used to prioritize the different classes of requirements from the perspective of each stakeholder. The two preference schemata are combined to judge rank the importance of the different classes of requirements for the final business value of the software product. AHP assumes that the problem under investigation can be structured as an attributive hierarchy with at least three levels. On At the first level, the overall goal is described. The second level is to describes the different competing criteria that refining the overall goal of level 1. Finally, the third level is devoted to be used for the selection from competing alternatives.

At each level of the hierarchy, a decision-maker performs a pair-wise comparison of attributes assessing their contributions to each of the higher level nodes to which they are linked. This pair-wise comparison involves preference ratios (for actions) or importance ratios (for criteria). The expert assigns an importance number that represents the importance of a term $t_i$ with respect to another term $t_j$ to describe the domain.

Priority decisions become more complicated in the presence of stakeholders having different relative importance and different preferences. It becomes very hard in the presence of constraints about sequencing and coupling of requirements in various increments, and taking into account resource allocation for implementation of requirements. None of the methods mentioned above can be applied under these circumstances.

Amongst the informal approaches claiming to handle release-planning, one of the most well known ones is 'planning games' as used in agile development. The goal of this approach is to deliver maximum value to the customer in least time possible. In half to one day long sessions, customers write story cards describing the features they want, while developers assign their estimates to those features. The customers then choose the most promising story cards for the next increment by either setting a release date and adding the cards until the estimated total matches the release date, or selecting the highest value cards first and setting the release date based on the estimates given on them.

This simplistic approach works well in smaller projects. However, as the size and the complexity of the projects increases, the decisions involved in release planning become very complex. Various factors come into play, such as the presence of stakeholders having different relative importance and different preferences, the presence of constraints about sequencing and coupling of requirements in various increments, and the need to take into account resource allocation issues for implementing the requirements. Considering problems involving several hundreds of requirements and large number of widely scattered stakeholders, it becomes very hard to find appropriate solutions without intelligent support tools. The goal of such support is to account for all these factors in order to come up with a set of most promising release plans.

SUMMARY OF THE INVENTION

There is therefore provided, according to an aspect of the invention, a method of release planning. The method comprises the steps of assigning stakeholder priorities to a set of requirements, where the priorities are assigned by plural stakeholders; explicitly defining a set of constraints on the requirements; and using algorithms carried out by a computer, exploring release plan solutions that satisfy the constraints and balance between stakeholder priorities of different stakeholders to generate a set of candidate release plan solutions that have a positive impact on at least one of project time, overall cost and quality; and selecting at least one release plan solution from the set of candidate release plan solutions. The solution may be further qualified by applying a concordance/non-discordance principle. A set of near optimal and maximally distinct solutions may also be generated. Operating on the stakeholder priorities with algorithms using a computer may be carried out repeatedly after changing one or more of the constraints, requirements or stakeholder priorities, which may comprise actions chosen from a group consisting of adding additional requirements, removing existing requirements, modifying existing requirements, and adjusting stakeholder priorities. The method may also comprise the step of assigning in advance specific requirements to one of the next release, the next but one release, or unassigned before repeating the operations to the remaining. Repeating the step of operating on the stakeholder priorities or value estimates with the algorithms may comprise using the unassigned and new requirements as the requirements in the repeated step.

According to a further aspect of the invention, the algorithms comprise one or more of genetic algorithms, heuristic algorithms and integer programming algorithms, and may use at least one objective function, which may comprise an aggregation of stakeholder priorities or value estimates, to evaluate release plan solutions. Computation of the algorithms may be carried out externally from an application service provider, and stakeholder priorities may be input to the computer from remote locations.

According to a further aspect of the invention, selecting a release plan solution from the set of candidate release plan solutions is carried out by a problem solver. The method may also be carried out through a hybrid approach integrating computational intelligence and human intelligence. A set of maximally distinct alternative release plan solutions may be provided. Different use cases may be predefined. Process guidance may provided to perform the scenario use cases.

According to a further aspect of the invention, the set of constraints is chosen from a group consisting of precedence relationships between requirements, coupling relationships between requirements, effort, resource, budget, risk, and time. Stakeholder priorities may be represented by a numerical value representing stakeholder satisfaction that a requirement be assigned to one of three categories, the categories consisting of the next release, the next but one release, and postponed. The requirements may be grouped into groups of requirements and the algorithms balance between stakeholder priorities assigned to the groups of requirements. Stakeholders may prioritize subsets of the complete set of requirements.

According to a further aspect of the invention, an answer is provided on demand to questions chosen from a group of questions consisting of why requirements are assigned to a certain release, why requirements are not assigned to a certain release, which are commonalities in the proposed solutions, and which are differences in the proposed solutions.

According to a further aspect of the invention, there is provided a computer programmed to carry out the invention, or computer readable media containing instructions for a computer to carry out the invention.

BRIEF DESCRIPTION OF THE DRAWINGS

Preferred embodiments of the invention will now be described with reference to the figures, in which like reference characters denote like elements, by way of example, and in which:

FIG. 5 is a block diagram of a mutation operator;

FIG. 6 is a block diagram of single chromosome elitism;

FIG. 7 is a block showing fitness values and probabilities;

DETAILED DESCRIPTION OF THE PREFERRED EMBODIMENTS

In the claims, the word "comprising" is used in its inclusive sense and does not exclude other elements being present. The indefinite article "a" before a claim feature does not exclude more than one of the feature being present.

In this patent document, we discuss features and requirements as main characteristics of a release plan. Features are considered to be a logical unit of behavior that is specified by a set of functional and quality requirements. In other words, features are an abstraction from requirements that both customers and developers understand. The topics discussed in this patent document are applicable to both the original requirements as well as to their aggregation into features and when either is referred to it will be understood that it applies to both, unless the context clearly indicates otherwise. While release planning specifically for software is discussed, it will be appreciated that the principles in this patent document are applicable to other situations that involve incremental releases, for example, IT, telecommunications, pharmaceuticals, finance, transport, agriculture, or other projects such as oil and gas.

Software release planning as formulated later in this patent document extends prioritization in five directions:

Release planning is based on a set of (representative and most important) stakeholders which can input priorities from a remote place (don't need to attend a physical meeting), There is a formal procedure to balance all the stakeholder priorities to determine an overall prioritization result. As part of that, the degree of importance of the different stakeholders can be varied.

Release planning takes into account (estimates of) the implementation effort. In addition, it can also handle constraints related to risk, money, or technological dependencies.

Release planning considers the time of implementation by assigning features to (predefined or not) releases.

The formal procedure of release planning is able to consider different criteria (urgency, importance) and to bring them together in a balanced way.

Figure 1:
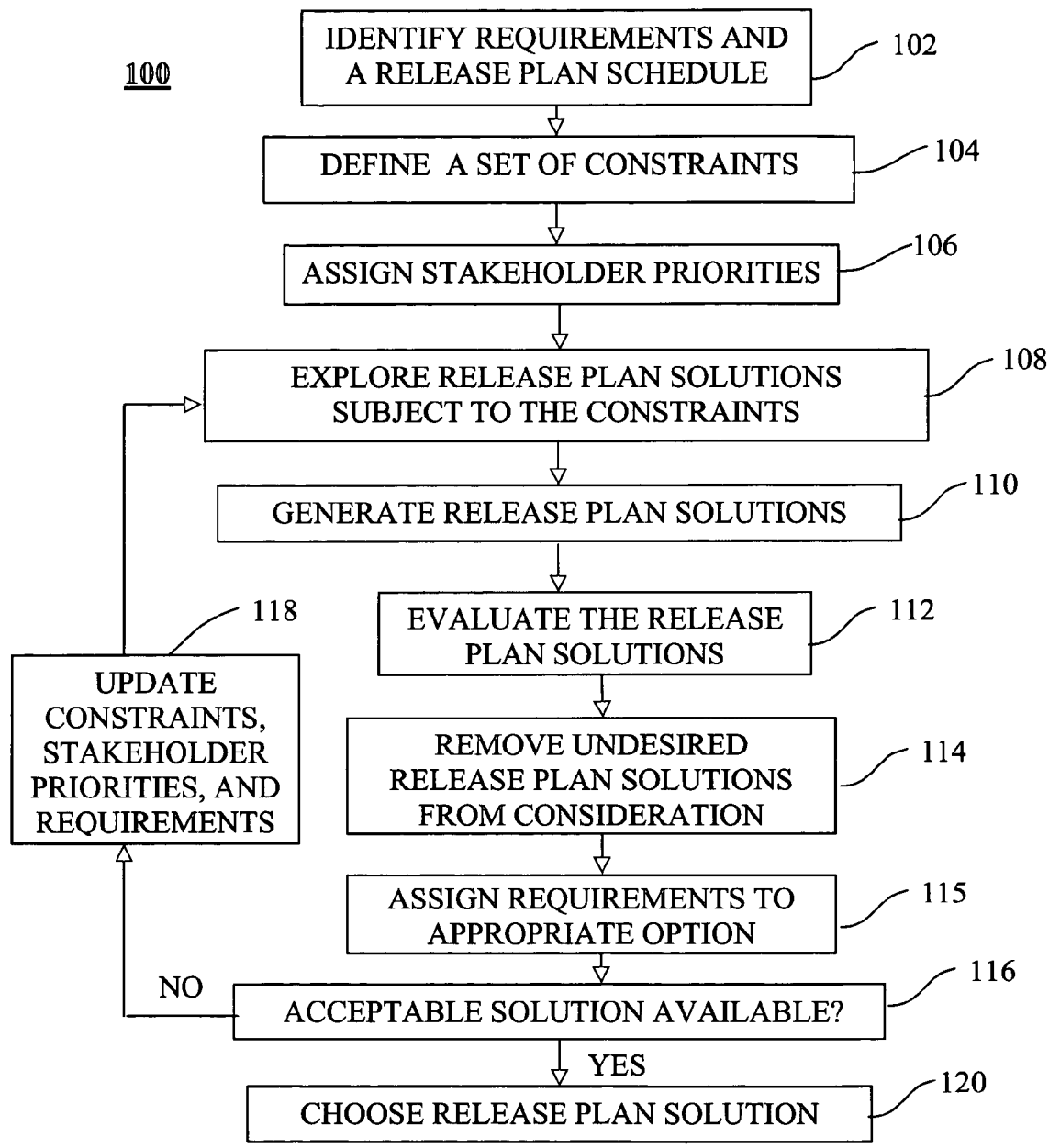
FIG. 1 is a flow chart of the release planning process.
Figure 2:
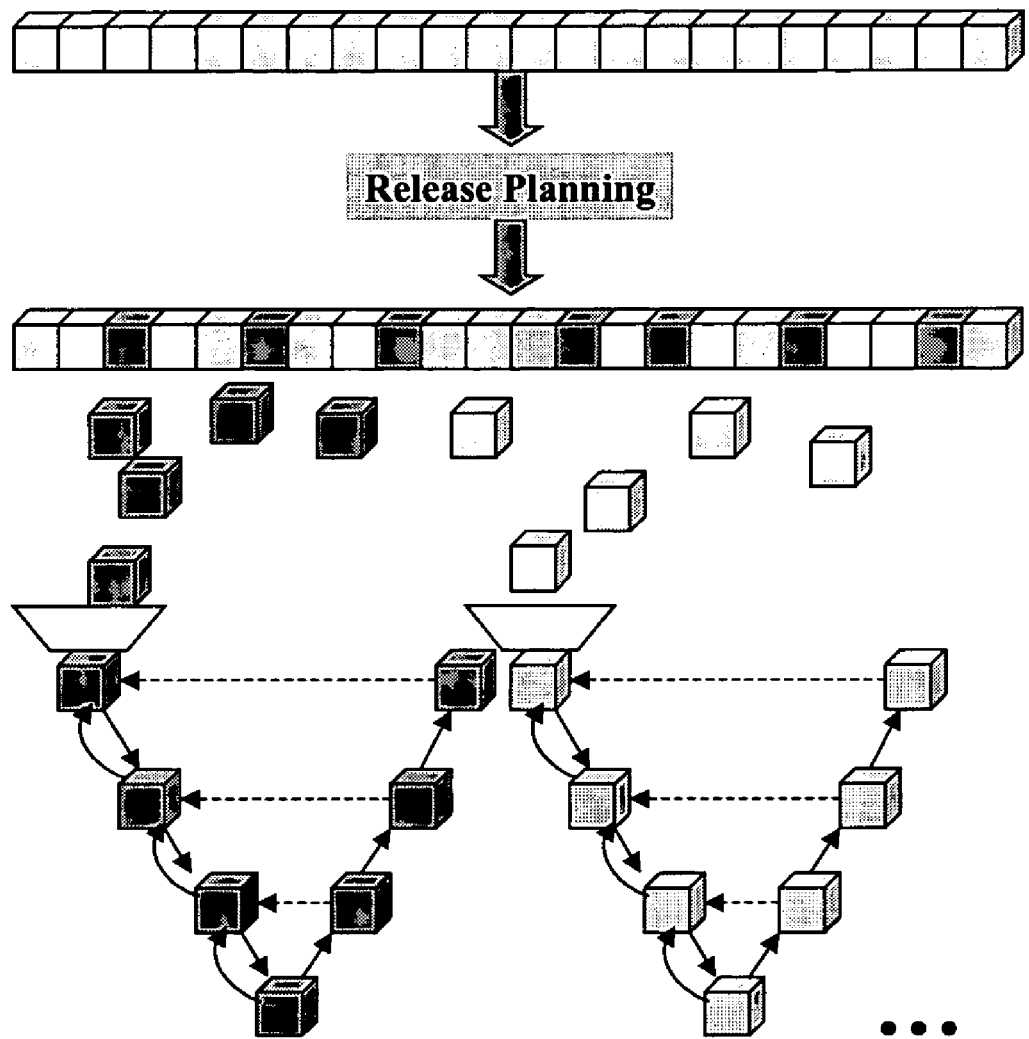
FIG. 2 is a diagram demonstrating the process of planning and developing of releases.

Referring to FIG. 1, an exemplary embodiment of a method of release planning, indicated by general reference character 100, will now be discussed. In the first step 102, the requirements and/or features are identified. This step may also include a determination regarding the number and frequency of releases. In step 104, the set of constraints are defined, and in 106, stakeholder priorities are also assigned, as will be described in more detail below. For example, stakeholder priorities may be assigned by the stakeholders themselves using remote computers accessing a host computer over a network such as the internet. Alternatively, a wireless connection could be used to get access to the network, with a user interface prepared that is customized for handheld computing. The next step 108 is to use algorithms, namely computer based optimization algorithms such as genetic algorithms or integer programming, to explore release plan solutions that satisfy the constraints and balance between stakeholder priorities of different stakeholders.

The exploration step 108 typically takes place at the host computer and generates a set of candidate release plan solutions that have a positive impact on at least one of project time, overall cost and quality as shown in step 110. The release plan solutions are evaluated by human intelligence in step 112, and outperformed release plan solutions are removed from consideration in step 114. In step 115, requirements are assigned to one of the three options, according to the analysis and information available to the decision maker. If a release plan solution is evident in step 116, we may then proceed to choose a solution in step 120. Because of all the inherent uncertainties and dynamic changes, this is unlikely to happen on the first iteration, and the constraints, stakeholder priorities and requirements are updated in step 116. Updating may include seeking further stakeholder input based upon requirements assigned to a specific release, or modifying the constraints to the new situation. Changing the requirements may also include adding additional requirements, removing existing requirements, or modifying existing requirements. Step 116 is optional, and merely allows the decision maker the opportunity to adjust the situation based upon changing circumstances or a better understanding of the problem. We then return to step 108 to operate once again on the priorities subject to the constraints. The process continues until a best choice release plan solution is evident. The overall process is supported by an explanation component. Throughout the release planning process, answers may be provided to the following questions: why are requirements assigned to a certain release? Why are requirements not assigned to a certain release? Which are commonalities in the proposed solutions? Which are differences in the proposed solutions? It will be apparent that the step described can be implemented by programming a computer or preparing computer readable media with instructions for a computer.

Software project planning and management requires balancing competing objectives, managing risk, and overcoming constraints to successfully deliver a product that meets the needs of both customers and the users. The planning stage is based on decisions about which features should be implemented in which release—as provided by release planning. In other words, release planning results are the input for the more detailed project planning and later project management.

1. Formal Problem Statement 1.1 Requirements, Features and Constraints

Release planning is based on an evolving set of features and requirements. The number of releases to be considered in advance may vary from case to case. We use "option k" for the assignment of a feature to increment k. Because of the high degree of requirements volatility, it does not make sense to plan too many releases in advance. For this embodiment, and without loss of generality, we will only consider two releases in advance. This is considered to be a good compromise of looking into the future while accepting the uncertainty and volatility of the problem. Consequently, as a result of release planning, each feature is assigned to exactly one of three possible cases:

next release (option 1),
next but one release (option 2), or
postponed or not (yet) considered for implementation (option 3).

Let $F=\{f_1, \ldots, f_n\}$ be the set of features to be assigned to releases, which may also be referred to as increments. Whenever applicable without ambiguity, $\{1, 2, \ldots, n\}$ is used instead. As introduced above, release planning is distributing F into three categories: "next release" (option 1), "next but one release" (option 2), and "not yet decided" (option 3). Consequently, a release plan is characterized by a vector x of decision variables $$x=(x(1), x(2), \ldots, x(n)) \text{ with } x(j)=k \text{ if feature } j \text{ is assigned to option } k.$$

Assignment of features to increments can't be done without considering the different types of dependencies. Dependencies between features are represented by relations defined on the product set F×F of F. We use the following six types of dependency between features:

Type 1:
i AND j if feature i requires feature j to function and vice versa.
If two features are in Type 1 relationship then they must belong to the same increment.

Type 2:
i FREQ j if feature i requires feature j to function, but not vice versa.
If two features are in Type 2 relationship then i should not be implemented in an earlier release than j.

Type 3:
i TREQ j if implementation of feature i requires implementation of feature j.
If two features are in Type 3 relationship then i should be implemented in the same increment as j.

Type 4:
i CVALUE j if feature i affects the value of feature j.
If two features are in Type 4 relationship then the value of the two in combination is different from the additive value (non-additive value functions) when applied in isolation.

Type 5:
i ICOST j if feature i affects the implementation of feature j.
If two features are in Type 5 relationship then the effort of the two in combination is different from the additive value (non-additive effort function).

Type 6:
i IND j if feature i and feature j are in none of the first five types of dependencies.

For the sake of simplicity, we assume that dependencies of types 4 and 5 are handled by synthesizing these features into a new (integrated) one. To model dependencies of types 1 to 3, we introduce a directed graph $G(R)=(V(F), A(F))$ with a set of vertices $V(F)$ and a set of arcs $A(F)$. Feature ii from a set of features F is represented by vertex set $i \in V(F)$. The set $A(F)$ of arcs is defined from dependencies of Type 1 to 3 as follows:

Type 1: i AND j implies $(i,j) \in A(F)$ and $(j,i) \in A(F)$
Type 2: i FREQ j implies $(i,j) \in A(F)$
Type 3: i TREQ j implies $(i,j) \in A(F)$ With the graph $G(F)=(V(F), A(F))$, we can formulate dependency constraints as $$x(i) \leq x(j) \forall (i,j) \in A(F)$$

In other words, we intend to restrict the number of dependencies between requirements and their assignment to different releases by some fixed degree of relative coupling between options. Alternatively to what is presented above, we may define a structural ratio bound called 'Coupling' and a related constraint as:

Struc(x)=(# of edges of P between different options)/card(P)≦Coupling

Release planning is impacted by a number of constraints. These constraints could be related to different aspects such as effort, risk, or budget. The effort to implement a requirement is hard to estimate. For the easiest case, we assume an effort function, effort: $\mathfrak{R} \rightarrow R^+$ assigning to each feature an estimated effort for its implementation. As this effort is typically hard to predict, we assume that it is based on estimates such as the optimistic, the pessimistic and the most likely effort. For the sake of simplicity, we further assume an additive function for the implementation of set $A \subset \mathfrak{R}$. We further assume an effort capacity bound Effort_Bound(k) for both the next two releases under consideration. This bound summarizes all the available resources for the different stages of development of a specific release product. From this resource perspective, all feasible release plans should fulfill the respective effort constraint for release options 1 and 2, e.g., $$\text{Effort}(k, x) := \sum_{x(i)=k} \text{effort}(i) \leq \text{Effort\_Bound}(k) \quad \text{for } k = 1, 2.$$

In the same way, we can perform a risk evaluation for each feature. Risk estimation is used to address all the inherent uncertainty associated with the implementation of a certain feature. We employ a risk score as an abstraction of all risks associated with a given feature. These risks may refer to any event that potentially might negatively affect schedule, cost or quality in the final project results.

For each feature i, 'risk' is an interval scaled function, risk: $\mathfrak{R} \rightarrow [0,1)$, where '0' means no risk at all and '1' stands for the highest risk. In what follows we assume that the risk assessment is done by expert judgment. We further assume, that the risk is independent from the assigned release. The objective of risk balancing is to avoid a concentration of too many risky features in the same increment. The risk per increment is supposed to be additive, and Risk_Bound(k) denotes the upper bound for the acceptable risk for options 1 and 2. This leads to constraints $$\text{Risk}(k, x) := \sum_{x(i)=k} \text{risk}(i) \leq \text{Risk\_Bound}(k) \quad \text{for } k = 1, 2.$$

In some cases, financial constraints are important as well (or even the most important constraint). From a purely monetary perspective, we assume an estimated financial effort required to realize feature i. For each feature i, 'finance' is an interval scaled function, finance: $\Re \to R^+$ assigning to each feature an estimated amount of money for its implementation. As there is an available financial budget Finance_Bound(k) for both the next two releases under consideration, all feasible release plans have to fulfill $$\text{Finance}(k, x) := \sum_{x(i)=k} \text{finance}(i) \leq \text{Finance\_Bound}(k) \quad \text{for } k = 1, 2.$$

Typically, project releases are planned for certain dates. This introduces a size constraint $Size^k$ in terms of effort of any released increment Inc(k). We have assumed that the effort for an increment is the sum of the efforts required for individual requirements assigned to this increment. This results in another constraint:

$$\sum_{r(i) \in Inc(k)} \text{effort}(r_i, R^k) \leq Size^k \quad \text{for all increments } Inc(k).$$

A Releases may also be arranged according to open scope release planning, where release times are not predefined. If this approach is used, the definition of the release times and the requirements or features assigned to the respective releases are obtained as results. In this case, a solution may be sought that minimize the time between releases, since the earlier a release is issued, the earlier it generates value, such as money. Another point to consider is whether there are any sub, or otherwise related, products. In this case, each may have its own release planning goals, however, for the overall products, the different cycles have to be synchronized. This can be modeled and solved using integer programming. The notion of 'open scope planning' can be extended to address synchronization of releases as requested in any kind of embedded product development where you have to address planning of different parts (hardware, software, middleware). Each of these components is an open scope problem. However, for the final product, planning for all the components has to be synchronized because of the mutual dependency between the components. The solution is approached through a formal description of the problem that uses binary variables and applying genetic and integer programming optimization algorithms.

Another consideration is resource-driven release planning. For all the variants of release planning, consideration of available resources is crucial. Based on an up-front judgment of which requirements need which resources for their realization, feasible plans can be determined with respect to their implementation effort.

Using all, or a selection of the constraints as introduced above, we are able to define feasibility of release plans. A release plan x is called feasible if it fulfills all the model constraints. The set of all feasible release plans is denoted by X.

1.2 Stakeholder Priorities
1.2.1 Stakeholder

One of the challenges of software development is to involve stakeholders in the requirements engineering process. System stakeholders in the area of software engineering may be defined as people or organizations who will be affected by the system and who have a direct or indirect influence on the system requirements. This definition may be broadened or narrowed according to the situation.

Effectively solving the problem of release planning involves satisfying the needs of a diverse group of stakeholders. Stakeholder' examples are: user (novice, advanced, expert or other classifications of users, manager (project, product), developer, or sales representatives.

Software engineering focuses on producing high-quality software products on time and within budget. However, there is a mutual dependency between the three dimensions. According to "The magic triangle", any improvement in terms of either cost or time or quality is impacting the remaining ones. The challenge is to pro-actively investigate how to define and how to achieve a most appropriate balance.

We assume q different stakeholders abbreviated by S1, S2, . . . , Sq. Each stakeholder Sp is assigned a relative importance $\lambda_p \in (0,1)$. The relative importance of all involved stakeholders is typically assigned by the project or product manager. If it is difficult to actually determine these weights, pair-wise comparison using the analytic hierarchy process can be used as a support. We assume that stakeholder weights are normalized to one, i.e., $$\Sigma_{p=1,\ldots,q} \lambda_p = 1.$$

We also assume that the requirements or features are understandable by all stakeholders and sufficiently detailed to estimate the effort for their implementation. It is understood that detailed descriptions are required, as those requirements that are poorly described are more likely to receive lower prioritizations from stakeholders. In addition, stakeholders will have different perspectives on the problem and different needs that must be addressed by the release plan. According to their main interest, they might focus more on quality, time, or benefit. Stakeholders may not be able or comfortable enough to rank all priorities. A stakeholder may therefore be considered active or inactive with respect to each requirement. Additionally, requirements may be described hierarchically, such as by grouping requirements into groups, where stakeholders may only look at a higher level of aggregation, based on their level of expertise, interest, or specialization.

Let S={S1, . . . , Sr} be the set of stakeholders. Whenever applicable without ambiguity, {1, . . . , r} is used instead of {S1, . . . , Sr}. The set S is partitioned into three subsets $$S = S^t \cup S^b \cup S^q$$

According to their respective focus on time (St), benefit (Sb) and quality (Sq). Within each category, a stakeholder Sp is given a relative importance (p) satisfying $$\Sigma_{p \in S^t} \lambda_p = \Sigma_{p \in S^b} \lambda_p = \Sigma_{p \in S^q} \lambda_p = 1.$$

There are different ways to express stakeholder prioritization of requirements. The concrete selection depends on the specific conditions and preferences. We give two example schemata:

Prioritization schema type 1: The judgment of stakeholder p with regard to requirement i is denoted by Sat(p,i) where Sat(p,i) ∈ {1,2,3,4,5} can represent the perceived satisfaction.

Prioritization schema type 2: For each requirement i, the stakeholder p is asked to represent his/her satisfaction with the situation that requirement i is assigned to option k (k=1,2,3). His/her judgment is expressed by Sat(p,i,k) ∈ {1, . . . , 9}. In total, each stakeholder has nine votes to distribute among three options, i.e., $\Sigma_{k=1,2,3}$ Sat(p,i,k)=9.

The higher the number of votes (s)he assigns to k, the more satisfied (s)he would be if the requirement is put in the respective option.

The increasing focus on value creation as a result of software development implies the question of the impact on value for the different features or requirements. Typically, there are different and conflicting priorities between different (groups of) stakeholders. To determine the most attractive feature and product portfolio's, priorities have to be evaluated to the best knowledge available. There are different ways to evaluate the 'priority' of a feature from a stakeholder perspective. Alternatively to the method presented above, two dimensions of priority may also be considered: a value-based, and an urgency-based prioritization. Value addresses the assumed impact on the value of the final product. Value here is considered to be independent of time. Urgency more addresses the time-to-market aspect, maybe, to reflect market needs and competitor analysis information. Intuitively, what we are trying to achieve is to assign features of high value and high urgency to first releases. We define two attributes for priority evaluation:

1.2.2 Value

Value-based software engineering can help to identify a process in which value related decisions can be integrated in software engineering practices. It has been suggested that we can no longer afford to follow a value-neutral approach where

- software engineers treat every requirement, feature, use case, object, defect or other artefacts as of equal value;
- methods and practices are largely logical activities not primarily taking into account the creation of value;
- software engineers use earned-value systems to track project cost, schedule, but not stakeholder or business value;
- concerns are separated from software engineers' turning requirements into verified goals, and
- setting goals for improving productivity or correctness independent of stakeholder value considerations.

There is no easy and crisp definition of value. It can be (i) a fair return or equivalent in goods, services, or money, or (ii) the monetary worth of something, or (iii) relative worth, utility or importance. Without being more precise about the concrete meaning, we expressed 'value' by a nine-point (ordinal) scale with increasing order of value corresponding to increasing value-based priority. The judgment of stakeholder p with regard to feature i is denoted by value(p,i) where value(p,i) $\in \{1, 2, \ldots, 9\}$ represents the perceived value of the feature i for stakeholder p. We are using a nine-point scale of measurement which could be replaced by another (e.g., five-point) scale in dependence of the degree of knowledge about the subject. The higher the number, the higher the perceived value of feature i. As a guideline and, we define value(p,i)=1 if feature i is of very low value value(p,i)=3 if feature i is of low value value(p,i)=5 if feature i is of moderate value value(p,i)=7 if feature i is of high value value(p,i)=9 if feature i is of extremely high value 1.2.3 Urgency We have introduced the three options on how to assign a feature to releases. Urgency addresses the degree of satisfaction with these three possible from the individual stakeholder perspective. Urgency can be motivated by time-to-market of certain product features. For each feature i, the stakeholder p is asked to represent his/her satisfaction with the situation that feature i is assigned to option k (k=1,2,3). His/her judgment is expressed by sat(p,i,k) $\in \{1, \ldots, 9\}$ with $$Sat(p, i) = (sat(p, i, 1), sat(p, i, 2), sat(p, i, 3))$$

for all features i and all stakeholder p $$\sum_{k=1,2,3} sat(p, i, k) = 9 \text{ for all features } i \text{ and all stakeholder } p$$

1.3 Objectives and Formal Problem Statement

The question of what actually constitutes a good release plan needs careful consideration. Intuitively, we are expecting most valued and most urgent features first. However, 'most valued' and 'most urgent' might mean different things for different types of stakeholder. The user is expecting features that he or she would need first to get started. But there are different types of users such as novice, advanced and expert users having different types of expectations and preferences.

Potentially, there is a great variety of formally stated objective functions. Two examples are:

Objective function type 1: Aggregation of all stakeholder opinions using a normalized weight vector w=(w$^t$,w$^b$, w$^q$) with w$^t$+w$^b$+w$^q$=1. In conjunction with prioritization schema type 1, the objective function F(x) is defined as $$\text{Max } F(x) = \sum_{z=t,b,q} w^z \left( \xi_1 \sum_{x(i)=1} WAS^z(i) + \xi_2 \sum_{x(i)=2} WAS^z(i) \right)$$

where $\xi_1 + \xi_2 = 1$ and $$WAS^z(i) = \sum_{p \in S^z} \lambda_p Sat(p, i)$$

denotes the weighted average satisfaction for requirement i from the perspective z=t (time), b (benefit), and q (quality). $\xi_1$ and $\xi_2$ are weights assigned by the project manager to options 1 and 2 (i.e. the two releases in consideration). Requirements assigned to the third option are not contributing to the objective function value.

Objective function type 2: In this schema, objective functions related to time, benefit, and quality are handled independently. The problem is multi-objective and we use Max* to denote the search for "most promising" solutions. In conjunction with prioritization schema type 2, the objective function vector is defined as $$\text{Max}^* \{Sat^t(x), Sat^b(x), Sat^q(x)\} \text{ with}$$

$$Sat^z(x) = \xi_1 \sum_{i:x(i)=1} WAS^z(i, 1) + \xi_2 \sum_{i:x(i)=2} WAS^z(i, 2) \text{ for } z = t, b, q$$

and $$WAS^z(i, k) = \sum_{p \in S^z} \lambda_p Sat(p, i, k) \text{ for } z = t, b, q \text{ and } k = 1, 2$$

Another proposition is a function combining the individual stakeholder evaluations from the perspective of value and urgency in a multiplicative way. For each feature i, we introduce the weighted average priority WAP(i,k) reflecting the product of the value and the urgency of stakeholders with respect to a fixed feature and a fixed option of assignment to releases.

Typically, not necessarily all stakeholders are able or comfortable to give their evaluation related to all features. A stakeholder p is called active with respect to feature i, if (s) has provided the evaluation (and is called passive otherwise). The set of active stakeholders with respect to feature I is denoted by P(i). For determining WAP(i,k), the sum of all individual weighted products is divided by the sum of all active stakeholder weights.

Further flexibility is introduced by the possibility to vary importance of stakeholder weights $\lambda_p$ and to weight the importance $\xi_1$ and $\xi_2$ of options 1 and 2, respectively. This results in the objective function F(x) defined as $$F(x) = \xi_1 \sum_{x(i)=1} WAP(i, 1) + \xi_2 \sum_{x(i)=2} WAP(i, 2) \text{ with}$$

$$WAP(i, k) := \left[\sum_{p \in P(i)} \lambda_p \cdot value(p, i) \cdot sat(p, i, k)\right] / \left[\sum_{p \in P(i)} \lambda_p\right]$$

for all features $i$ and $k = 1$ and 2.

For a fixed vector $\lambda$ of stakeholder weights and a fixed vector of bounds, the release-planning problem RP($\lambda$, bound) becomes Maximize F(x, $\lambda$, bound) subject to x $\in$ X.

However, what is more appropriate in real-world is to solve a sequence {RP($\lambda$, bound)} of problems with varying parameters $\lambda$ and bound. This solution set is typically small. From a solution set generated this way, the decision-maker can finally choose his or her most preferred solutions.

A more detailed problem statement will now be presented. For all requirements $r_i \in R^k$ determine an assignment $\omega^*$ with $\omega^*(r_i)=s \in \{1, 2, \ldots\}$ to increments Inc$^s$ such that $$\sum_{r(i) \in Inc(m)} effort(r_i, R^k) \leq Size^m \text{ for } m = k, k+1, \ldots$$

(Effort constraints)

$\omega^*(r_i) \leq \omega^*(r_j)$ for all pairs $(r_i, r_j) \in \Psi^k$ (Precedence constraints)

$\omega^*(r_i) = \omega^*(r_j)$ for all pairs $(r_i, r_j) \in \xi^k$ (Coupling constraints)

$$A = \sum_{p=1,\ldots,q} \lambda_p \left[\sum_{r(i),r(j) \in R(k)} penalty(r_i, r_j, S_p, R^k, \omega^*)\right] \Rightarrow \min!$$

with penalty($r_i$, $r_j$, $S_p$, $R^k$, $\omega^*$) :=

0  if $[prio(r_i, S_p, R^k) - prio(r_j, S_p, R^k)][\omega^*(r_i) - \omega^*(r_j)] > 0$ $|prio(r_i, S_p, R^k) - prio(r_j, S_p, R^k)|$  if $\omega^*(r_i) = \omega^*(r_j)$ $|\omega^*(r_i) - \omega^*(r_j)|$  if $prio(r_i, S_p, R^k) = prio(r_j, S_p, R^k)$ $[prio(r_i, S_p, R^k) - prio(r_j, S_p, R^k)][\omega^*(r_j) - \omega^*(r_i)]$  otherwise Function A minimizes the total penalties defined as the degree of deviation of the monotonicity property between requirements. Monotonicity property between two requirements is satisfied if one requirement is evaluated more promising than another, and this is true also for the sequence of the assigned increments.

$$B = \sum_{p=1,\ldots,q} \lambda_p \left[\sum_{r(i) \in R(k)} benefit(r_i, S_p, \omega^*)\right] \Rightarrow \max!$$

with benefit($r_i$, $S_p$, $R^k$, $\omega^*$) = $[\partial$-value($r_i$, $S_p$, $R^k$) + 1$][\tau - \omega^*(r_i) + 1]$ and $\tau = \max\{\omega^*(r_i) : r_i \in R^k\}$ Function B maximizes the total benefit. For a fixed stakeholder, the benefit from the assignment of an individual requirement to an increment is the product of some value difference and some difference in increment numbers. The product is the higher, the earlier the requirement is released and the more impact on final business value is supposed.

$C(\alpha) = (\alpha-1)A + \alpha B \Rightarrow max!$ with $\alpha \in (0,1)$

The overall objective function C for one fixed value of $\alpha$ is to maximize a linear combination of A and B. The case of $\alpha$ close to 0 means to give a (strong) priority to stakeholder priorities. In a similar way, $\alpha$ close to 1 means a (strong) priority is given to the achieved benefits of assignment $\omega^*$.

Determine K best solutions from $C(\alpha_1), C(\alpha_2), C((\alpha_3)$ with $1 \leq K \leq 10$ and $0 < \alpha_1 < \alpha_2 < \alpha_3 < 1$.

In addition to those included above, other functions may be included to account for, for example, risk or size considerations.

All optimal solutions determined from this approach are known to be non-dominated (Pareto-optimal). The limitation of this approach is that in case of non-convex problems, only solutions located at the convex hull in the objective space are determined. However, our emphasis is to generate a (small) set of promising solutions from which the decision-maker finally can select. As optimality can't be guaranteed anyway, this limitation is not a real restriction in our case.

To offer a final set of K best solutions, three different values of $\alpha$ are considered. They reflect the different kinds of priorities including a balanced linear combination of the two criteria. The actual number K depends of the concrete problem. Typically, it will not require more than ten to provide an overview of the existing (most promising) solutions. Both K and the individual values of $\alpha$ are supposed to be determined by the actual decision-maker.

2. Solution Approach EVOLVE*

We have observed that the problem of release planning is extremely difficult because of its inherent uncertainty, size and complexity. It is unrealistic to expect that this problem can be solved completely in one iteration. Instead, our strategy is to try to gradually reduce the size and complexity of the problem and to increase the validity of the underlying model. Finally, we get a set of candidate solutions with reasonable size to be considered in depth by the decision makers.

The overall architecture of EVOLVE* is designed as an iterative and evolutionary procedure mediating between the real world problem of software release planning, the available tools of computational intelligence for handling explicit knowledge and crisp data, and the involvement of human intelligence for tackling tacit knowledge and fuzzy data. This is illustrated in FIG. 3.

Figure 3:
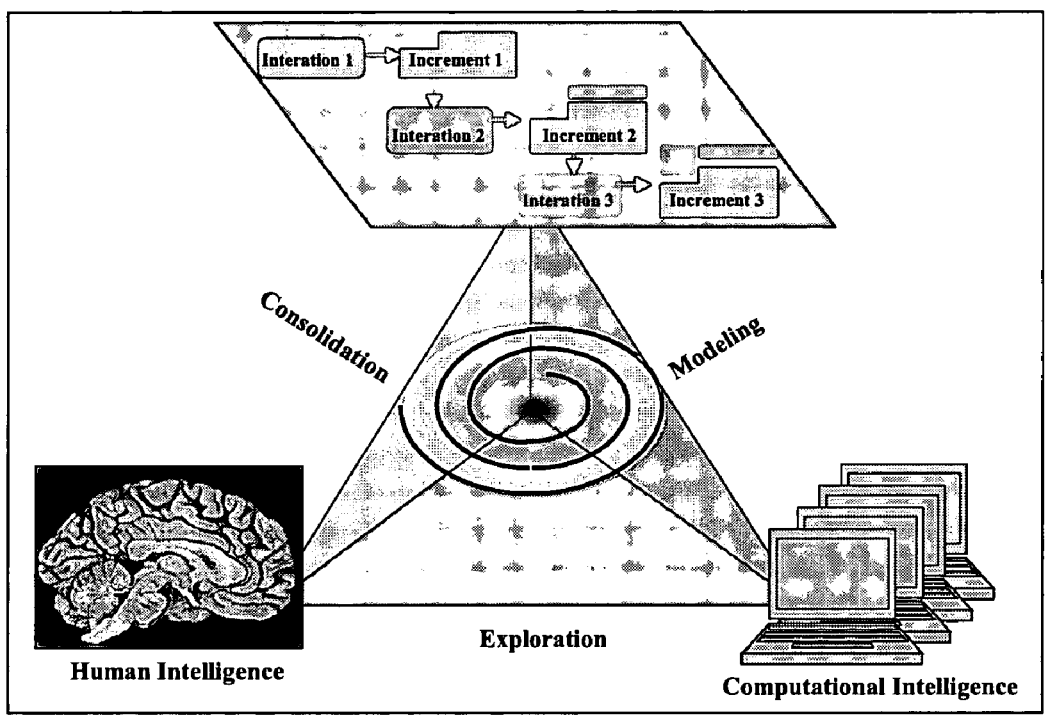
FIG. 3 is a diagram demonstrating the various parts of EVOLVE*.

Referring to FIG. 3, the spiral curve describes the performance of EVOLVE*. At all iterations, three phases are passed:

Phase 1—Modeling: Formal description of the (changing) real world to make it suitable for computational intelligence based solution techniques. This includes the definition of all decision variables, as well as their dependencies and constraints, and the description of what is, or contributes to, the "goodness" of a solution. Other data, such as stakeholder evaluation of all requirements, are also part of modeling.

Phase 2—Exploration: Application of computational techniques to explore the solution space, to generate and evaluate solution alternatives. Exploration phase may be based on evolutionary computing, IP formulations or other optimization algorithms that use objective functions such as those set out above. In particular, exploration using IP formulations may use commercially available IP software, in which the objective functions indicated above are maximized subject to sets of constraints such as the constraints described in this patent document.

Phase 3—Consolidation: Human decision maker is invited to investigate current solution alternatives. This contributes to the understanding of the problem and results in modifying parts of the underlying model or in some local decisions (e.g., pre-assigning some requirements to a release). Typically, these decisions reduce the size and complexity of the problem for the next iteration.

2.1 Hybrid Solution Approach EVOLVE*—Modeling

The model to be used for EVOLVE* has already been discussed. Models in general are abstract and simplified descriptions of reality. According to the objectives and the specific topic under investigation, models are always focusing on specific aspects of reality. Many concerns have to be left out to keep the model tractable. Meaningful models are characterized by clarity, simplicity, validity, and tractability. However, such models are hard to achieve from a single and isolated effort. Instead, we consider modeling as an ongoing effort with evolving models that are becoming more and more meaningful for the purpose of its use.

Modeling forms the basis for understanding and improving current reality. In general, meaningful results can only be achieved based on meaningful models. Equivalently, pure models will always imply pure results. For the problem of software release planning, modeling mainly comprises the definition of key variables, their dependencies, as well as definition of main objectives and constraints.

2.2 Hybrid Solution Approach EVOLVE*—Exploration

The exploration phase is devoted to generate and evaluate solution alternatives. Generation of feasible assignments of requirements to releases in a changing environment taking into account different stakeholder perspectives is a problem of large complexity and size (including hundreds of requirements, large number of stakeholder, and high percentage of dependencies and constraints). One option in the exploration step is to use the computational power of evolutionary (or genetic) algorithms. Genetic algorithms have arisen from an analogy with the natural process of biological evolution. While IP (integer programming) types of algorithms guarantee optimality, they are hard to apply for very large scale problems. Genetic algorithms are particularly well suited to NP-complete problems that cannot be solved by deterministic polynomial algorithms. It has been empirically shown that genetic algorithms can generate high quality solutions being optimal or near optimal even for large-scale problems.

Genetic algorithms maintain a population of solutions or chromosomes. A large population size improves the probability of obtaining better solutions and so should speed up the optimization process, although this is at the expense of computation time. Each member of the population receives a fitness measure, i.e., the value of the objective function. This measure relates to how good the chromosome is at solving the stated problem. Main operations applied to chromosomes of the population are selection, crossover, and mutation. Selection is effected by choosing two parents from the current population, the choice being determined by relating the fitness score to a probability curve. A more detailed description of genetic algorithms will be presented below.

The idea of offering decision support always arises when decisions have to be made in complex, uncertain and/or dynamic environments. An exemplary solution approach EVOLVE* generates a typically small set X of most promising candidate solutions from which the actual decision-maker can choose from. This set X is further studied during the consolidation phase. The emphasis of decision support is on support, not on actually making the decision. In the real world, additional and most recent influencing factors or constraints are taken into account in making the decision. This is best achieved through maintaining a set of K-Best solutions.

2.3 Hybrid Solution Approach EVOLVE*—Consolidation

The purpose of the consolidation phase is to structure and reduce the set of candidate solutions by applying human judgment and intelligence. This process is supported by intelligent techniques such as the principle of Concordance/Non-discordance and Information Theory.

The key element in this phase is the intuition of the decision maker. This is where the decision maker can combine the results obtained from the model (the set X of most promising solutions) with his/her experience, knowledge, and expectation. All these aspects are assumed not to be part of the underlying formal decision model. To achieve a higher degree of conformance with reality, the decision maker can examine set X to judge if the proposed solutions are in accordance with his/her preference. If the discrepancy is important, this may lead to a revision of the model. Otherwise, s/he can use X as a support to make further decisions such as pre-assignment of some requirements to some options, i.e. to reduce the size and complexity of the problem. When the size and complexity of the problem are reduced to a level that can be reasonably solved by human decision makers, he can decide to stop the process. Otherwise, s/he continues with the next iteration (modeling, exploration, consolidation).

When using X as a support to make further decisions, the decision maker can be assisted by the suggestions given by EVOLVE*. The first type of suggestion is due to the principle of Concordance/Non-Discordance. Intuitively, the principle suggests that if we have no formal reason to prove or disprove a proposition D then we can use the rule "If there are enough facts supporting the proposition D (concordance) and there is no fact strongly opposing it (non-discordance), then we should accept D". More precisely, if there are at least c % solutions of X that agree on the assignment of requirement i to option k (x(i)=k) and there is no more than d % solutions of X that strongly disagree on this assignment then the decision x(i)=k is proposed.

The second type of suggestion is inspired by an intuitive rule of thumb: "If there is at least one alternative from each of the (three) perspectives that agrees in a certain assignment of requirements to an option, then this option is worth to be further studied". This type of suggestion is possible only when the model is multi-objective, i.e., the set X consists of the K best solutions in terms of each objective. Formally, X is partitioned into $X=\cup X^z$, where $X^z$ consists of the most promising solutions in terms of objective (criterion) z. If in each $X^z$, there exists a solution $x^z \in X^z$ that agrees on the assignment of requirement i to option k ($x^z(i)=k$) then the decision $x(i)=k$ is proposed.

Another suggestion is to use the diversity of solutions. As explained, a core concept of solving release planning with all the inherent uncertainties is to offer a set of most promising solutions. In an ideal situation, where the objective function represent exactly the perception of the decision maker about the goodness of a solution and all the data collected are precise enough, there is no doubt that the best solution is the one given by the optimization model. However, most situations, particularly with the release planning problem, are far from being ideal. Therefore, to give a better support for the decision maker, it is more reasonable to propose a set of solutions instead of just one. The decision maker can use the part of knowledge that cannot be taken into account by the model to make the final decision. The principle of maximal diversity states "it is good to provide a decision maker with more options, it is better if these option are different". Naturally, the notion of diversity is based on the "similarity" or "distance" between two solutions. By introducing thresholds on the different objectives and introducing Euclidean distances between solutions, a set of maximally distinct alternative release plan solutions can be determined with the existing algorithms.

Here, we can use Euclidean distance $$\delta(X, X') = \sum_{i=1,n} (X(i) - X'(i))^2$$

We use the following procedure to implement the principle of maximal diversity as follow. Let k be the number of solutions expected to propose to the decision maker.

Step 1: Determine a Set CX of Near Optimal Solutions (Perhaps From Different Perspectives) |CX|>k To determine a set of near-optimal candidate solutions, the decision maker has to vary parameters such as the relative importance of increments, the weights of the stakeholders or the weights $W^z$ for different perspectives if he/she wants to combine these three perspectives. It is very difficult to give these values. One option is to ask some judgments such as: stakeholder 1 is "a little more important" than stakeholder 10; the group of stakeholders $S^t$ is "much more important" than $S^q$. Then try different ways to perceive the "goodness" (corresponding to different parameters and even objective functions). For each of them, choose the best (or the K-best) solution(s).

Step 2: Determine the Set of L Near-optimal Solutions Having the Maximal Distance Among Them.

Formally, we have the following model:

$$\text{Max } D(FX) = \sum_{X, X' \in FX} \delta(X, X')$$

$$FX \subset CX$$

$$\text{Card}(FX) = L(\text{fixed}).$$

Besides these suggestions, the decision maker can also consider other decision variables. As there is no clear suggestion from the analysis of X, these decisions are made mainly from his/her own judgment. To facilitate the choice of a variable to concentrate on, we can rank the decision variables from the most to the least conflicting. We represent the conflicting level by the "entropy" of the variable.

$$\text{Ent}(x[i]) = -p_1 \log_2(p_1) - p_2 \log_2(p_2) - p_3 \log_2(p_3), \text{ where}$$

$$p_k = |\{x \in X, x[i]=k\}|/|X|, k=1,2,3 \text{ and } 0\log_2 0 := 0.$$

Intuitively, if most of the solutions in X agree on the assignment of requirement i to option k then the conflicting level of this decision is low.

2.4. Genetic Algorithms

Genetic algorithms have arisen from an analogy with the natural process of biological evolution. They are particularly well suited to NP-complete problems that cannot be solved by deterministically polynomial algorithms. One commonly discussed problem area to which genetic algorithms have been applied is the Travelling Salesman Problem (TSP). It has been empirically shown that genetic algorithms can generate high quality solutions being optimal or near optimal even for large-scale problems. In the area of software engineering, this approach was successfully applied to devise optimal integration test orders.

Genetic algorithms are maintaining a population of solutions or chromosomes. A solution or chromosome is a set of requirements ordered for implementation. A population is a number of different chromosomes. The 'optimal' population size is a matter for debate. Some have suggested higher populations while others indicate that population sizes as low as thirty are adequate. A large population size improves the probability of obtaining better solutions and so should speed up the optimization process, although this is at the expense of computation time. Each chromosome or member of the population receives a fitness measure, i.e., the value of the objective function, such as one of the objective functions mentioned above. This measure relates to how good the chromosome is at solving the stated problem.

Figure 4:
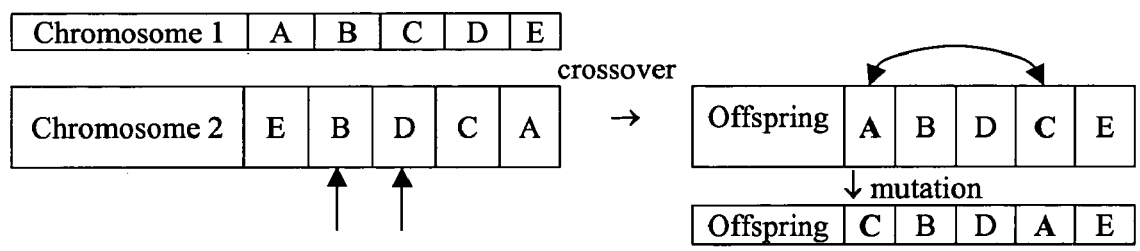
FIG. 4 is a block diagram of crossover and mutation operators.

The genetic algorithm applies a series of operations to the population of chromosomes in order to obtain a set of chromosomes with relatively high scores (fitness values) as indicated by the objective function corresponding to the chromosome. Main operations applied to chromosomes of the population are selection, crossover, and mutation. Referring to FIG. 4, selection is effected by choosing two parents from the current population. The choice is determined by relating the fitness score to a probability curve, as seen in FIG. 7, where the higher the fitness, the higher the probability. The crossover operator takes two parents, randomly selects items in one parent and fixes their place in the second parent (for example, items B and D in FIG. 4). These are held in position but the remaining items from the first parent are then copied to the second parent in the same order as they were in originally. If an item has already been used, that item is skipped, and we continue on with the next item. In this way some of the sub-orderings are maintained. Generally, a crossover may be accomplished by randomly selecting two points which become fixed in the second parent, as well as all items between these two points. Items from the first parent are inserted around the fixed portion in the order they appear. As multiples of the same requirement cannot exist, if a requirement is already present in the fixed portion, it is skipped, and the next requirement used in its place, until all requirements have been used, and all spaces filled in the new member of the population.

Figures 5, 6:
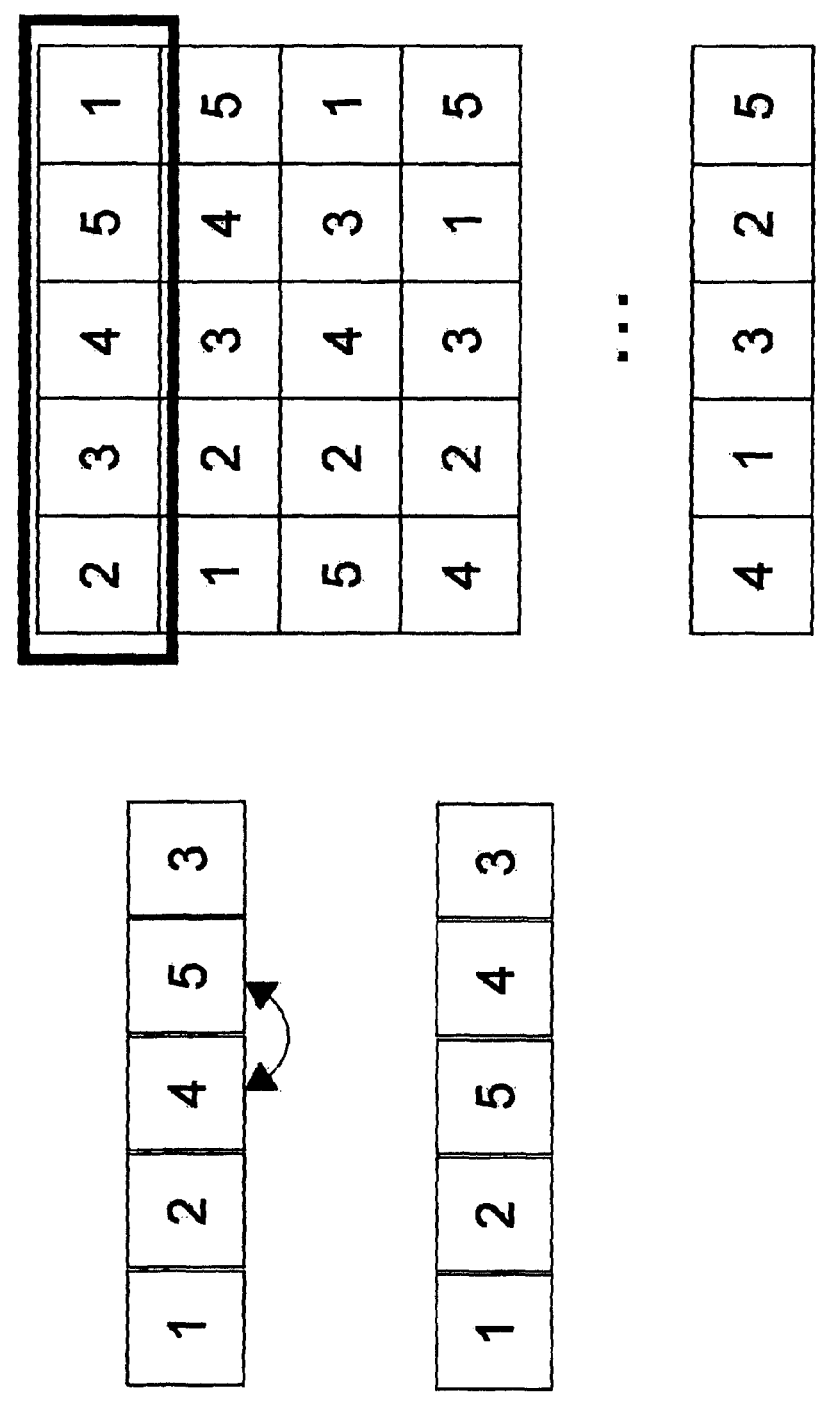

Mutation is carried out after crossover and is intended to introduce variance and so avoid terminating at a local solution. FIG. 5 shows an example of mutation, where the third and fourth genes are switched. Mutation introduces new orderings in the population that might not be reached if only crossover operations were used. Since the values in the chromosome must remain constant, the normal approach to mutation where one or more variables are randomly changed will not work. Hence, mutation is effected via random swapping of items in the new offspring. The number of swaps is proportional to the mutation rate. After a new chromosome has been produced, we check to make sure it is still valid according to the constraints that were previously defined. This ensures that each plan we generate is a valid one.

An example is shown in FIG. 4. Chromosome 1 and 2 are selected, and undergo crossover as described previously. The new offspring is ranked in the current population and the bottom ranked chromosome is discarded. Hence the population size retains a steady state. The extent of mutation is controlled by the parameter mutation rate. The choice of 'best' mutation and crossover rates is sensitive to the type of problem and its characteristics.

At each generation, members of the population are assessed for fitness. Different solutions result in different fitness scores depending on how they balance the priorities of the stakeholders. Frequently in using genetic algorithms this fitness refers to a cost function that has to be minimized or a payoff function that should be maximized. The processes of evaluation, selection, crossover and mutation continue, and the net effect is a gradual movement towards higher fitness scores in the population. Since genetic algorithms operate on a population rather than a single entity, the possibility of becoming stuck at local optima is reduced. The choice of when to terminate the algorithm may be determined by a predefined number of iterations, a preset elapsed time or when the overall improvement becomes negligible.

Figure 8:
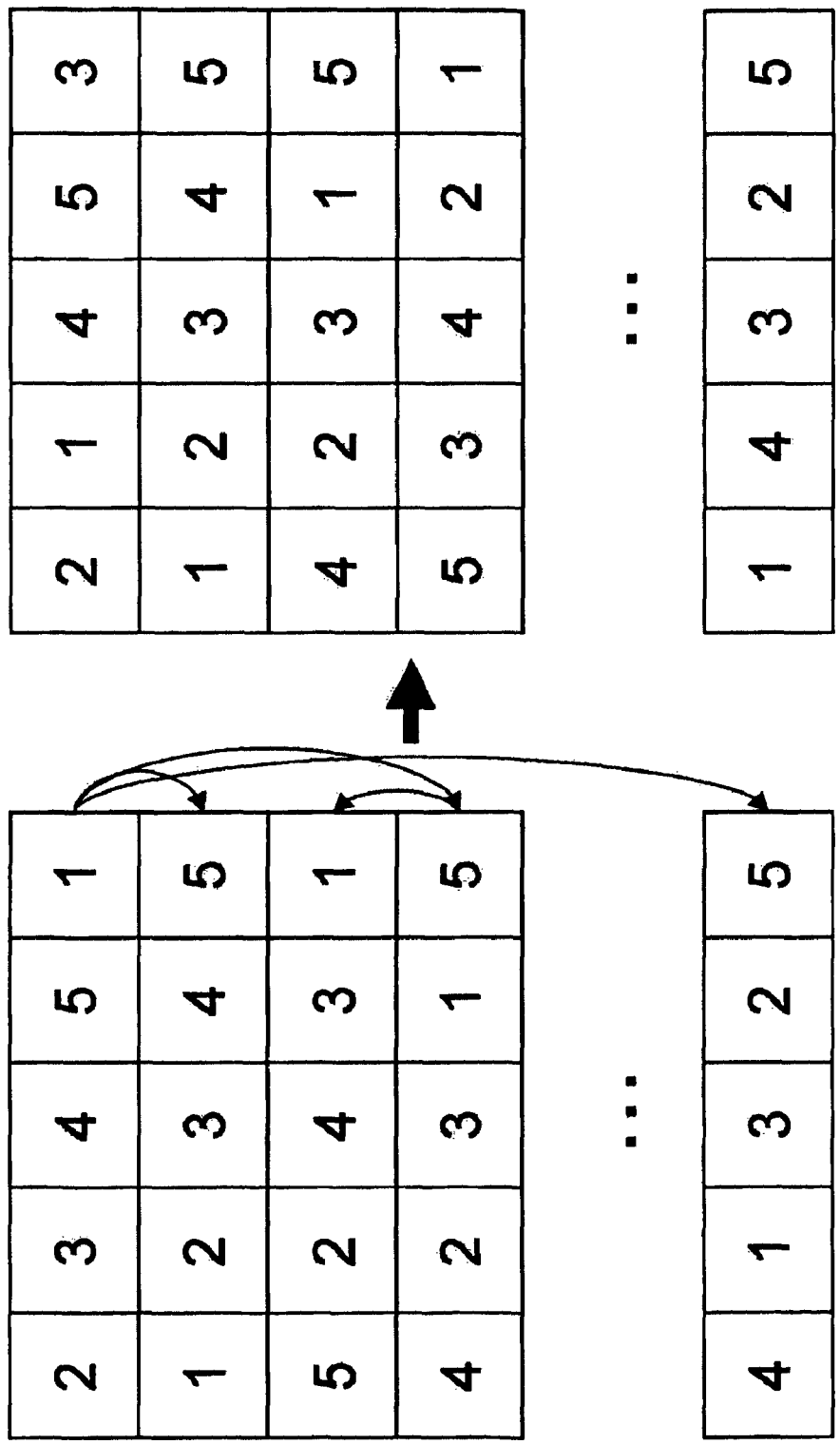
FIG. 8 is a block diagram showing the calculation of a generation.

As stated above, each member of the population is assessed for fitness. Referring to FIG. 7, a higher fitness value FV, which is obtained form the objective functions, translates into a higher probability P that the member will be used in an operation. For example, in a pool of fifty, the top 20 members may have a combined probability of 75% of being chosen, while the other 30 have a 25% probability of being chosen. In this way, more fit members will be used more frequently to generate the next generation, while the unfit members are more likely to be removed from the pool. The number of member in the pool is kept constant. Referring to FIG. 8, an example of a generation being calculated is used, where the arrows represent selection.

There are options that can be used in implementing the genetic algorithm. For example, referring to FIG. 6, single chromosome elitism may be used, which ensures that the best member stays in the pool for the next generation. Another option is seeding the algorithm at the beginning by a member generated by using what can be termed a greedy algorithm, by including it in the other randomly generated members. This generates a solution by sorting the requirements by the results of the objective function at the beginning. The solution is then reordered as little as possible such that it satisfies the constraints. This allows the good traits of the greedy plan to profligate through the population, often speeding the process of finding an optimized solution. Another option is single point crossover, where a single point is chosen, and the genes above or below that point are fixed, while genes from the other parent are inserted into the offspring in the order that they appear, removing the duplicated genes.

Each member of the pool contains all requirements. Once a solution is arrived at, the preferred member may be divided up into the releases based on constraints, such as time, effort, and budget using a bin packing strategy. Starting at one end, requirements are included in the order that they appear until the next requirement will not satisfy the constraint. The next requirements are examined to see if they are less demanding and if they are able to satisfy the constraints. In this way, the resources are more efficiently used.

3. Embodiment Example

As an example, an embodiment of the invention with key features will be described as a tool suite that provides a flexible and web-based tool support for assigning requirements or features to releases such that most important risk, resource, and budget constraints are fulfilled. It can be used in different user modes and aims in providing intelligent decision support for any kind of iterative development. It addresses the wicked character of the problem by an approach integrating computational and human intelligence, based on EVOLVE*. Main features of the tool are:

General Features
Portability: Browser-based tool enabling early and comprehensive stakeholder involvement
Compatibility and interoperability (with MS Excel, MS Project)
Flexibility: The tool is able to solve a wide range of problem types (in terms of prioritization scheme, objective function, and constraints)
Ease of use: State-of-the art menus support easy understanding and a steep learning curve
Scalability: Tool supports projects with a wide range of problem size.
Security: Version control, access control, password protection and file level control, protection of highly sensitive data
Applicability: Wide range of applications in any kind of phased or incremental product development in IT, logistic, pharmacy, oil and gas, banking, agriculture, telecommunication, and health care.
Rapid response time by usage of customized implementations of optimization algorithms Specific Features
Capabilities for grouping of requirements
Possibility of pre-assignment of requirements to releases
Coupling and precedence constraints between requirements
Consideration of effort
Consideration of resource, budget and risk constraints
Flexibility in voting: scale of voting (3,5,9-point scale)
Flexibility in type of voting (prio-based, value-based, both)
Flexibility in number of increments
Incomplete voting
Customer-specific access to hierarchical requirements
Generation of a set of 'most promising' solutions
Reporting capability
Generation of a set of 'near optimal' and "maximally distinct' solution alternatives
Process guidance following predefined usage scenarios
Explanation on demand on specific characteristics of solutions (Explanation component)
Stakeholder analysis determining commonalities and differences in stakeholder prioritization (Stakeholder analysis component)
Graphical output of stakeholder analysis
Import and export functionality
Graphical output of set of most promising release plans In addition, answers may be provided on demand to questions such as why requirements are assigned to a certain release; why requirements are not assigned to a certain release; which are commonalities in the proposed solutions; and which are differences in the proposed solutions. Explanation is intended to increase acceptance of the tool, to improve understanding of the results, and to increase applicability and acceptance of suggested solutions. When a planner or decision maker makes a plan or reaches a decision then the presentation of just the solution itself is often insufficient. This is in particular the case if the decision is done by a black box system where complex calculations and much knowledge are involved. In such a situation two problems arise: (i) the user often has no insight in the major reasons that lead to the presented solution. In particular, if the solution is somewhat surprising the user has difficulties to accept it. Therefore, the user may not trust and may not accept the solution; and (ii) because of the lack of understanding, the user is not able to give feedback. In particular, the user cannot mention that certain parts mentioned in the explanation are not valid in the specific situation of the problem. These problems are due to the fact that the user has limited knowledge about fundamental problem understanding, the knowledge and information units relevant for obtaining the solution and the way such units are combined for finding the solution.

In such a situation an explanation is usually helpful. An explanation can fail to reach this goal for the following reasons: the explanation is incomplete, i.e. relevant aspects are missing; the explanation is too detailed, in particular it mentions too many facts that are known to the user or technical details; or explanation is not understandable by the user. The release planner explanation scenario involves three types of agents (participants): the system that provides the solution to the problem: In our context a software agent; the user who obtains the solution for further treatment, in out context a human agent; and the explainer who explains the system's solution to the user, in our context a software agent.

Here we are interested in the explainer agent. The explanation agent needs knowledge about the other agents. More precisely, the explainer needs an understanding of how the system obtains the solution, and a model of the user. A user model in general describes (i) What the user knows and (ii) What the user wants or needs to know. In some way, one can think of an explanation as an answer to (yet) unexpressed questions of the customer; therefore somehow the concept of a dialog enters the scenario. In particular, it gives again rise to distinguish to types of explanations: a) One-step explanations, provided only once, and b) Dialog-type explanations that proceed in several steps. Both types contain a communication aspect, for a) it is degenerated.

In general, the amount of explanation as requested is given during release planning. This means, more details are only provided if the user demands them. In particular, no routine operations are explained but rather decisions that look surprising to the user. The strategy is hence guided by the user who therefore plays the active role in the dialog.

3.1 Usage Scenarios

Use cases describe a sequence of actions that the system will perform to achieve an observable result of value for the user. Described below are some use case scenarios. In addition, the use cases may be graphically animated to facilitate usage of the tool and understanding of the value of the tool.

Process guidance may be utilized in the use cases. This means that the user will decide for a certain scenario, and will be guided through the sequence of actions to be performed in the use case by, for example, a wizard telling what to do next. Process guidance may also include a knowledge or lessons learned repository where certain knowledge, lessons learned or templates for documentation are provided from previous experiences during the release planning process.

3.1.1 Stakeholder Priority Analysis

Background:

Mismatch of customer satisfaction still with the functionality of the delivered software is one of the main reasons that software projects fail. To achieve better customer satisfaction, their early involvement is crucial. In globally performing companies, stakeholders (including the different types of customer) are distributed all over the world. Having a large number of potential features and a larger number of stakeholders, the question of defining typical patterns of priorities. As a kind of pre-analysis, data mining is used to detect commonalities and differences in stakeholder prioritization of features.

This scenario is aiming to better understand stakeholder preferences without actually performing the release planning. It is expected that results are varying in dependence of different classes of stakeholders (e.g., different groups of users, different roles in the overall product development process, different customer regions). Main benefit here is to enable and efficiently gather a large set of stakeholder preferences. As the tool is web-based, the scenario is cheap and guick. The result provides essential information to address main customer needs. The scenario is applicable for both new product development and for maintenance-type extension of an existing product.

Input:

All stakeholders are asked to present their priority evaluation. The evaluation is based on the description of the features (or requirements). The overall information is secured and is only visible by the product (or project) manager.

Output:

Main differences and commonalities in feature priorities of the different (groups of) stakeholder.

3.1.2 Operational Planning and Re-Planning

Background

This scenario is aimed to better understand the problem and the impact of the problem parameters. A number of different parameter combinations are studied to analyze the results and compare them with the constraints and possibilities of the real world. This scenario will typically apply fast heuristic algorithms that are generating good, but not necessarily optimal solutions. As a results of this scenario, the decision-maker will get a more transparent understanding of the problem objectives and constraints. Where are the project bottlenecks? What has to be provided to achieve certain goals? This problem understanding is important because it is a prerequisite to generate meaningful models and meaningful results.

The same principle is applied for the case of re-planning. As problem and project parameters change quite frequently, it is important to optimally adjust to new situations. This process is time-consuming and failure-prone if done in an ad hoc fashion. Again, the scenario is applicable for both new product development and for maintenance-type extension of an existing product Input:

In addition to the input of the scenario "Stakeholder priority analysis", the product or project manager inputs different possible options (or changes) for the following variables:

Available effort,
Available (bottleneck) resources,
Available time intervals for the releases,
Risk profile of the releases, and
Pre-assignment of features to releases (as a ramification of a performed competitor analysis)
Weight (importance) of individual stakeholders.

Output:
  Best solution alternatives in dependence of the different scenarios.
  Detection and explanation of their commonalities and differences.
  Detection and explanation of project bottlenecks.

3.1.3 Customer-Optimal Product Portfolio's

Background

This scenario aims in defining the appropriate product portfolio for an assumed set of key customers with evolving feature requirements. This product family could be part of a software product line. Product lines are characterized as a family of (software) products. The members of the family are variants having a set of common features. The process of scoping tries to find out all the tentative features. This could happen by a workshop with main customers describing their expectations of the product features. Different variants of the same product family can be seen as releases. As there is some technological dependency between them, the process of defining the "most appropriate" portfolio of products can be modeled as a release-planning problem.

This scenario could be supported by any kind of collaborative environment. In the easiest case, this could be a teleconference. The product or project manager guides and moderates the process. The intelligence of the tool is the backbone for making proposals on how to balance the conflicting stakeholder interests.

Input

All stakeholders are asked to present their priority evaluation. Stakeholders here are mainly potential clients or customers. Their assumed importance can be expressed by their respective individual weights. Any type of technological dependency between features has to be modeled as well as the estimated effort for each of the features. The process can be performed in a batch mode or (highly interactive with different sequences of possible parameters) in a workshop type session.

Output

Optimal strategies for product portfolio's. For a product line, design of release and their optimal sequence are defined. Independent of product lines, an optimal (or near-optimal) sequence of products is generated that addresses the different priorities of an existing customer base.

3.1.4 Cyclic Planning for Competing Objects Under Resource and Technology Constraints Background The notion of release planning can be applied to any type of cyclic product planning. Annual planning of projects or, in general, selection between competing objects are typical examples of that. All these plans are looking ahead for the next one, two or more cycles. In addition, constraints as the ones introduced in section 2 have to be satisfied.

Input

Formally, the input is the same as for the scenarios above:
  Available effort,
  Available (bottleneck) resources,
  Risk profile
  Weights of stakeholder
  Stakeholder evaluation of objects.

Output

Optimal or near-optimal plans for the cycles in consideration.

3.1.5 Synchronization of Releases

Background

In the case of a product that is composed out of individual sub-products, release planning can be applied to different parts separately. These parts could be related to hardware, middle-ware and software components. To release a version of the product, all the releases of the sub-product have to be synchronized. Non-synchronized release plans would result in a situation where the delivery of the product is delayed whenever one of its inherent parts is delayed.

Input

Any of the scenarios of above can be applied, but all information is provided for all the individual sub-products.

Output

Synchronized release plans provide optimal performance for the integrated product. All the release plans of the individual sub-products are adapted to achieve final synchronization.

Enterprise Application Integration (EAI) Planning

Background

EAI enables an enterprise to integrate its existing applications and systems and to add new technologies and applications to the mix. EAI also helps an enterprise to model and automate its business processes. Integration technology enables organizations to improve their business processes while retaining more value from their existing investments, thereby increasing their business agility and improving efficiency. By using EAI, big companies can save as much as 80 percent of the cost of doing a custom integration project.

Input

Available resources to be integrated become the requirements, and the constraints defined above are adapted to the specific situation. Stakeholder priorities are obtained for which constraints are to be integrated in what order.

Output

A release plan for the order of integration of the various priorities.

4. Case Studies

Software Release Planning

Figure 9:
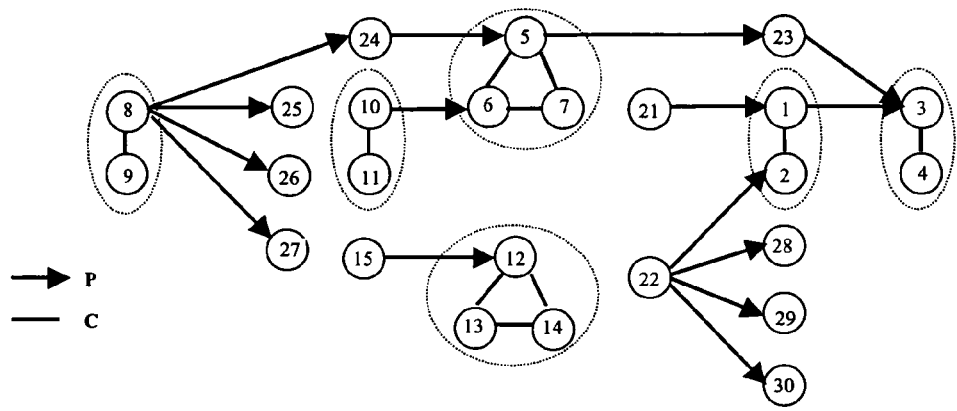
FIG. 9 is a dependency graph.

We consider an example with 30 requirements and three stakeholders. Each stakeholder represents exactly one of the objectives related to time, benefit, and quality. Therefore $S^t=\{S_1\}$, $S^b=\{S_2\}, S^q=\{S_3\}$ and $\lambda_1=\lambda_2=\lambda_3=1$. Initially, the data collected consist of the effort estimation for each requirement and the dependencies among them represented by two binary relations, C (coupling) and P (precedence). All these dependencies are represented by a dependency graph G=(V, E, A) shown in FIG. 9. G is a mixed graph with vertices corresponding to requirements and edges $(i,j) \in E$ if requirements i and j are in coupling relation C. In the same way, arc $(i,j) \in A$ if requirements i and j are in precedence relation P. The capacities available are Cap(1)=120 (next release) and Cap(2)=90 (next but one release) units of effort (e.g., person days).

We demonstrate the course of iterations with the three phases described above from the perspective of the actual project manager (PM). Our emphasis here is not so much on the numerical part of the problem solution. Instead, because of its inherent vagueness and uncertainty we are focusing on the evolution of the understanding of the problem, the model evolution, and the progress that is made during iterations to solve the proposed problem.

Modeling (Iteration 1): At first, the PM has to decide on the prioritizing scheme. The consultation with the stakeholders goes to the consensus on the voting scheme (prioritization scheme type 2) because of its simplicity and its applicability. For the objective function, the PM decides to consider all three competing objectives (time, benefit, quality) separately. The reason of this choice is that the tradeoff among these three perspectives is rather complicated; the use of this scheme helps preserving these perspectives so that the tradeoff can be handled more carefully. Thus the objective function type 2 is chosen.

Exploration (Iteration 1): The PM uses a computer to run a genetic algorithm of the type described here to explore the proposed model. An alternative is to use an IP formulation. From exploring the proposed model, the PM obtains a list of the most promising solutions (release plans) from each perspective. Each solution will contain a particular balance of stakeholder priorities, and will be a feasible solution according to the constraints of the model. S/he picks up 5 best solutions from each perspective to form the set $X=X^t \cup X^b \cup X^q$. The result is resumed in Table 1 at the end of this patent document. Each column (1-15) corresponds to a solution in X. The group of first five columns $X^t$ (respectively $X^b$, $X^q$) represents the 5 best solutions from the perspective time (respectively benefit, quality).

Row 'Sat$^t$' (respectively 'Sat$^b$', 'Sat$^q$') gives the value of objective function from time (respectively benefit, quality) perspective. Row 'Struc' is the number of P-edges between different increments (the total number of elements in P is 15).

Consolidation (Iteration 1): After verifying that the solutions in X are in compliance with his/her expectation, the PM proceeds with the analysis of X.

The first type of suggestion: The PM decides that a suggestion is worth his/her attention if it is supported by at least 13 out of 15 solutions and not strongly opposed by any solution. With this rule, s/he obtains 19 suggestions.

The second type of suggestion: The application of the rule "If there is at least one alternative from each of the (three) perspectives that agrees in a certain assignment of requirements to an option, then this option is worth to be further studied" results in eight suggestions how to assign requirements to releases. Details of the analysis are summarized in Table 2.

Initially, the PM considers the 19 suggestions of the first type. In general, s/he accepts these suggestions except some special cases where some new factors (not taken into account by the model) intervene. Finally, 17 suggestions are accepted. Requirement 29 is highly rated by the stakeholders, but the PM observes that the effort required is rather high (25 units) and the risk associated seem very high too (this is a qualitative judgment). Therefore, s/he decides to assign it to option 3 (postponed). Another requirement, 24, is not very well rated by the stakeholders (suggested to be assigned to option 3). However, the PM "feels" that this requirement has an important influence on the implementation of other requirements. Since s/he is still not sure, this decision is postponed.

The PM feels uncertain concerning the other eight suggested assignment options. This is justified by two reasons: the discussion with the stakeholders does not lead to a consensus; the PM does not want to advance too fast and therefore, s/he wants to see the impact of his/her last decisions before continuing the process.

At the end of the first iteration, 18 requirements have been assigned. Because of the inherent uncertainty and vagueness, there are still 12 requirements to be considered. That means the size of the problem is considerably reduced.

Modeling (Iteration 2): The PM decides to continue with the same underlying model as in iteration 1. As the PM has made some decisions that are different from the suggestions, it is necessary to run iteration 2 to observe the effect of these decisions (if the PM chooses to accept the all the suggestions, these decisions only reduce the set X; and there is no need to run iteration 2).

Exploration (Iteration 2): This time, the solution space has become smaller; the PM observes that in each perspective, the 4th best solution is "far away" from the "best one" in term of the values of the corresponding objective function, i.e. it is no longer necessary to consider this solution as promising. Therefore, s/he decides to pick up only three most promising solutions from each perspective (Table 3). Again, a genetic algorithm, IP formulation or other optimization process is used to explore the solution space and find solutions with a balance between stakeholder priorities which are favorable according to a fitness measure.

Consolidation (Iteration 2): This time, the rule used for the first type of suggestions is "If a suggestion is supported by at least 8/9 solutions and not strongly opposed by any solution, then it is worth our attention". Again, these suggestions are summarized in the Table 4. There are 9 suggestions, but only 4 decisions are made.

The PM decides to assign {8,9} to option 2 instead of option 1 as suggested by the formal algorithm. S/he also realizes that the four other suggestions (second type) are not easy to tackle all at the same time. It is more reasonable to concentrate on some issues. S/he decides to consider the least conflicting issues (requirements 16, 20, 27 with entropy =0.8). After a thorough examination and discussion, s/he decides to assign requirement 20 to option 1 as suggested, requirement 27 to option 3 instead of 1 and postpone the decision concerning requirement 16. At the end of this phase, there are still only 8 requirements to consider.

Modeling (Iteration 3): There is no new change to the model except the last three decisions reducing the size of the problem to 9 decision variables.

Exploration (Iteration 3): Again, due to the reduction of the solution spaces, s/he picks up only two best solutions from each perspective. However, certain solutions are among the best in more than one perspective; finally, the PM can choose only three solutions which are resumed in Table 5. We observe that solution 1 is the best from all three perspectives.

Consolidation (Iteration 3): The size of X is so small (only 3 solutions) that its analysis does not provide a better insight of the problem. Within a set of three solutions, a rule based on the concept of "majority" seems not very convincing. The PM has two options: to continue with a more sophisticated model or to stop. For the rest of the problem, the issues to consider are the most subtle, and there are many other factors to take into account. The first option would be very time consuming and could not assure an appropriate solution. Furthermore, the size of the problem has been considerably reduced. S/he decides that the rest of the problem be handled by human decision makers through an adequate negotiation process. S/he decides to just eliminate the solution 2 since the structure index is rather high (10) and accepts the two other solutions as the most promising ones for further consideration.

Figure 10:
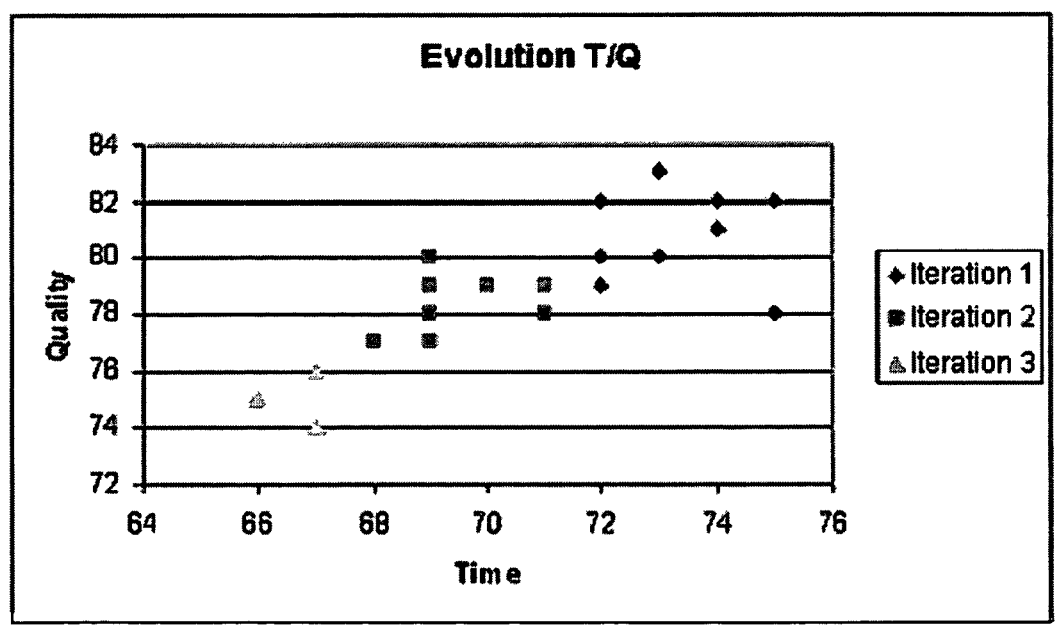
FIG. 10 is a graph of time versus cost of the evolution of solutions over three iterations.
Figure 11:
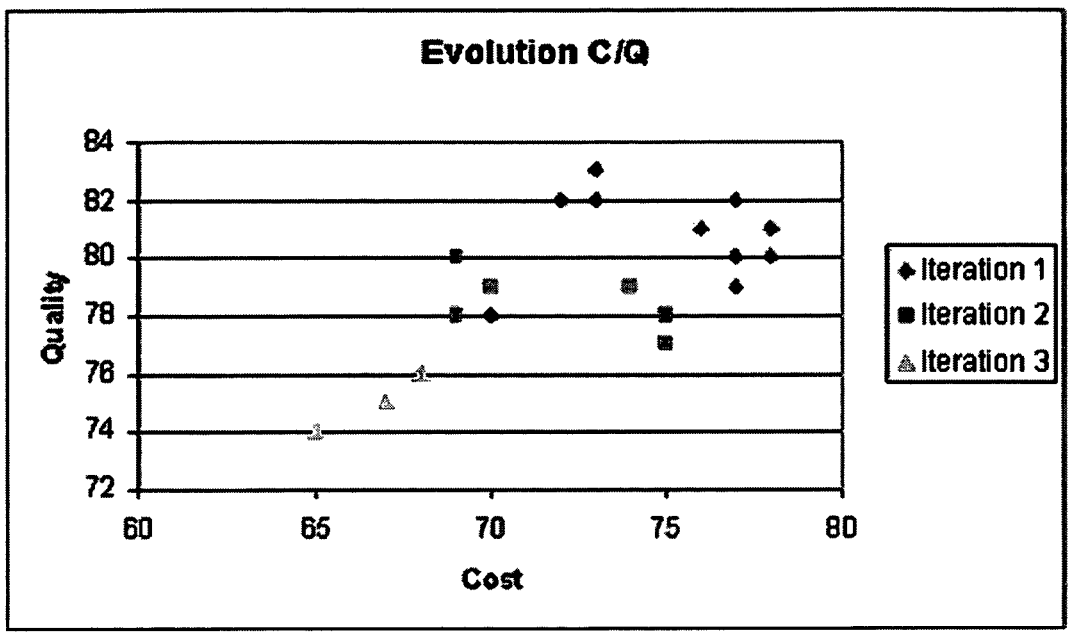
FIG. 11 is a graph of cost versus quality of the evolution of solutions over three iterations.
Figure 12:
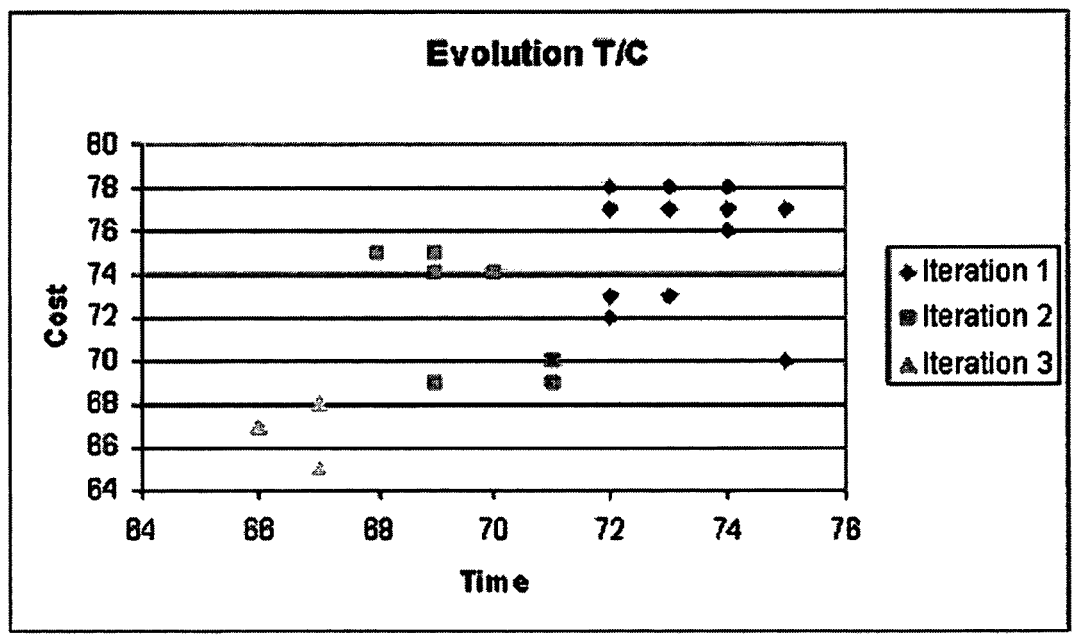
FIG. 12 is a graph of time versus quality of the evolution of solutions over three iterations.

The evolution of the set of most promising solutions taken over all three iterations is summarized in FIGS. 10, 11 and 12. To facilitate the observation of the evolution, a 3-dimension presentation (time, cost, quality) is replaced by the three 2-dimensional graphs. We observe that a better conformance of the proposed solution is achieved to the disadvantage of the formal value of the objective functions. This is due to the overall uncertainty of the problem situation and the increasingly better problem understanding achieved by the synergy of computational and human intelligence.

Enterprise Application Integration (EAI) Planning Example

Figure 13:
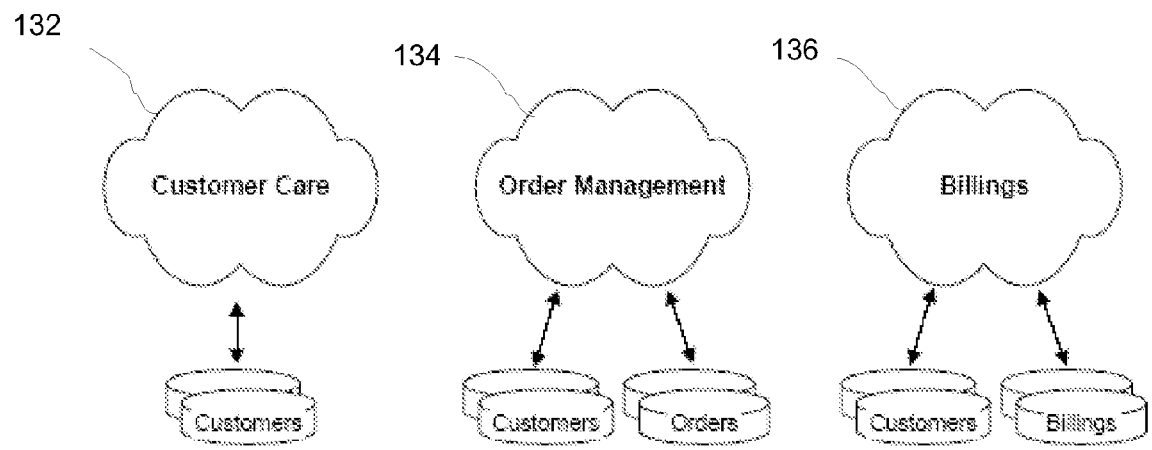
FIG. 13 is a graph showing different software packages to be integrated.

Most sites invest heavily on software packages. As shown in FIG. 13, they may have customer care systems 132, order management systems 134, and billing systems 136, among others. These may be already in place and working. All of these will have been purchased (or written) to address a particular business need or function, and they are all very good at what they do.

Systems 132, 134, and 136 have their own view of how the business works and together they help us run our business. However, there is little or no communication between them. They each work as individual packages—doing what they do and that's that. Let's just consider this example and think through how we could enable some of these packages to communicate and be more integrated with each other.

Figure 14:
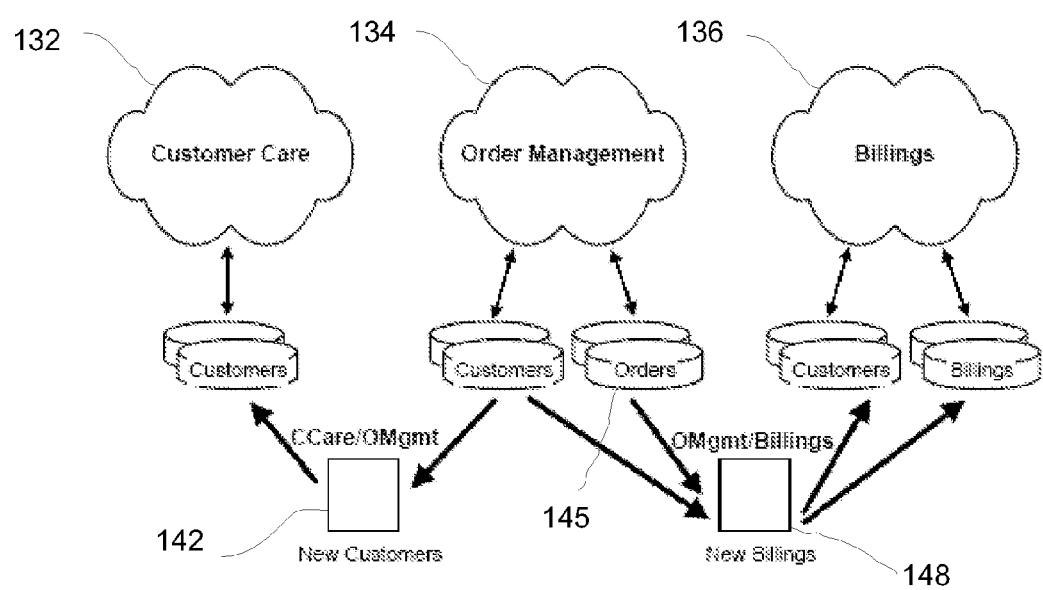
FIG. 14 is a graph showing different software packages in communication.

As indicated in FIG. 14, to enable the customer care system 132 to see if orders have been placed by any new customers, we could write a batch job that:

Interrogates the customer database 144 of the order management system 134

When it finds a new customer it could enter these details into the customer database 143 within the customer care system 132

To enable the order management system 134 to automatically kick off a new billing once the order has been fulfilled, we could write a batch job that:

Scans the orders database tables 145 to see any completed orders for that day

Looks up the customer information from the orders customer database 144 and with all the necessary information it could make an entry into the appropriate database tables 146 within the billing system 136

To enable the billing system 136 to manage billing issues, we could write a batch job that:

Gets billing history

Retrieves all the billing records for the given customer from the billing customer database 147

Besides the above integration requirements, two translators 142 and 148 are needed:

Translator 142 to translate new customers from the order management system to the customer care system 132

Translator 148 to translate new billings from the order management system 134 to the billing system 136

Figure 15:
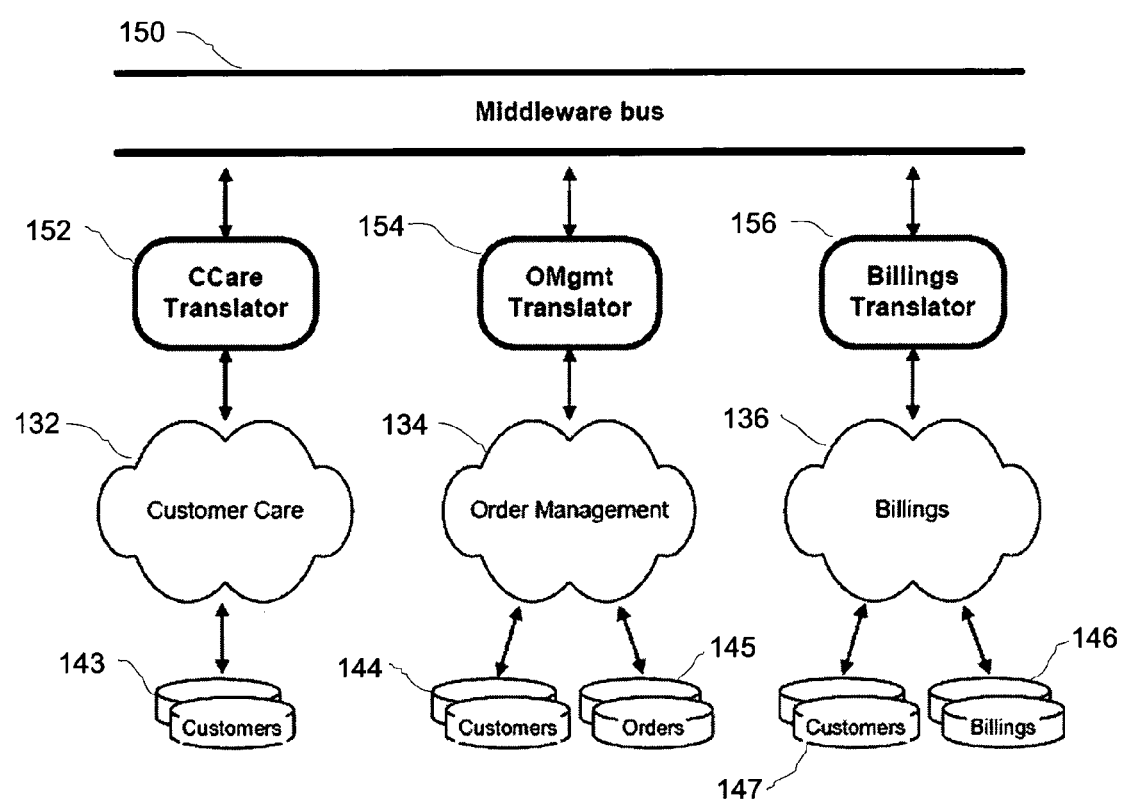
FIG. 15 is a graph showing different software packages to be integrated with a middleware bus.

However, in order to make the integration extendable with other systems and applications in the future, referring to FIG. 15, it is better to use a middleware 150 who has its own common language with which each individual system can communicate with. Therefore, the communication between systems can be achieved easier and more efficient. Accordingly, the need of the above two translators 142 and 148 shifts to three translators 152, 154, and 156:

Write customer care translator 152 from the customer care system to an agreed common language to facilitate communications between systems Write order management translator 154 from the order management system to an agreed common language to facilitate communications between systems Write billing translator 156 from the billing system to an agreed common language to facilitate communications between systems Besides serving as a common or generic language, the middleware 150 is also able to facilitate the translators to be plugged in and to make calls to other translators on it.

Figure 16:
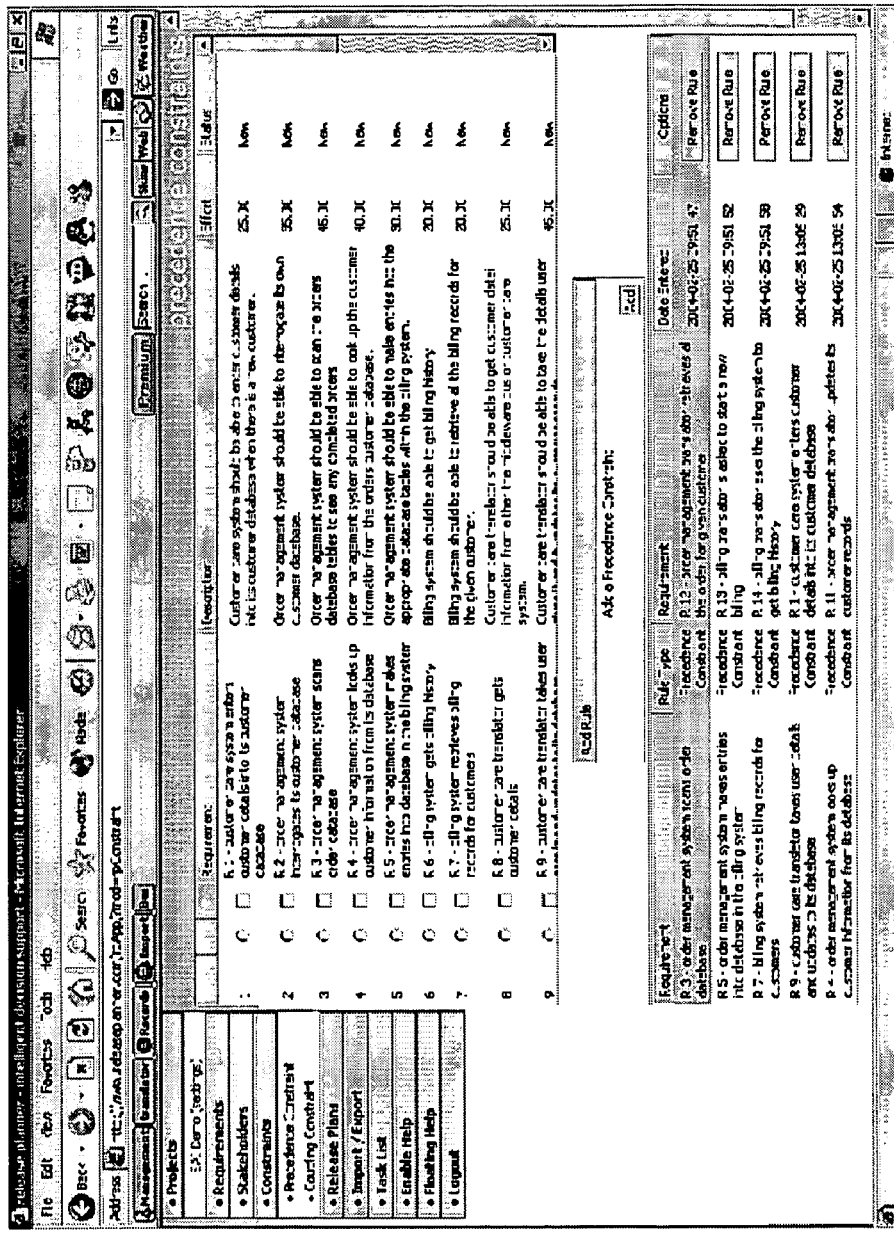
FIG. 16 is a screenshot of the layout of requirement dependencies.

In FIG. 16, a screenshot from the tool ReleasePlanner™ shows the layout of requirement dependencies. The precedence and coupling dependencies identified above are highlighted in the rectangles. The screenshot shows the tool as a web-based tool.

There are different kinds of stakeholder who have the judgment on which requirement should be implemented in which release of application integration. Their judgments base on their different perspectives and interests. Stakeholders can be:

Sales representative

User (novice, immediate, advanced, expert)

Investor

Shareholder

Project manager

Product manager

Developer

Figure 17:
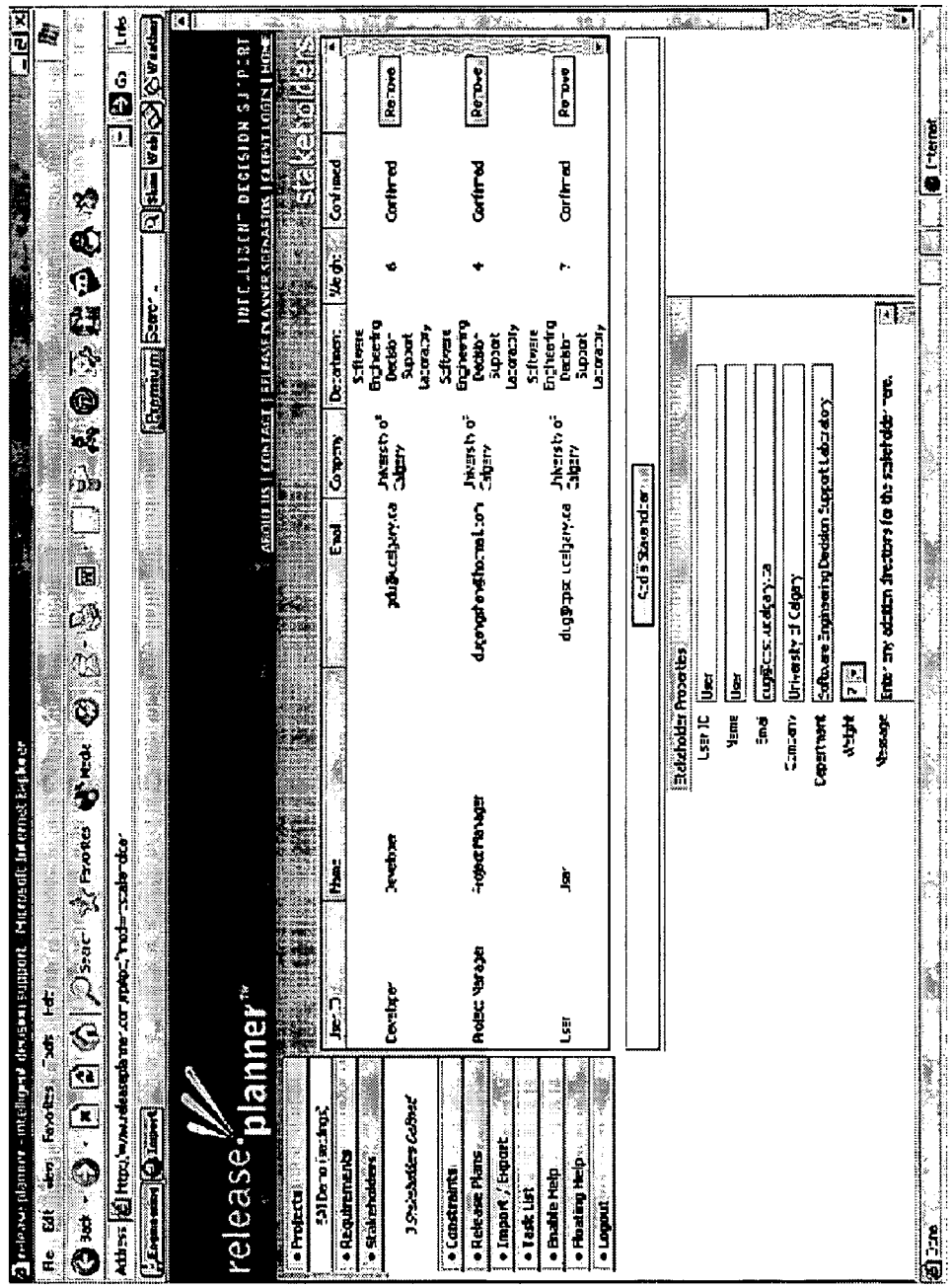
FIG. 17 is a screenshot of the layout of stakeholders.

In this EAI scenario, we choose user, project manager, product manager as the example stakeholders involved in the planning of integration. These stakeholders have different priority on the requirement evaluation. We use the 0~9 scale to demonstrate their importance. The larger the number is, the more important the corresponding stakeholder is. An example screenshot of stakeholders in ReleasePlanner™ is shown in FIG. 17.

After finishing the input of all the above release planning data, release plans can be generated by choosing the function "Generate a Plan" in the ReleasePlanner™. Various plans that can meet the constraints defined previously can be generated one by one.

Figure 18:
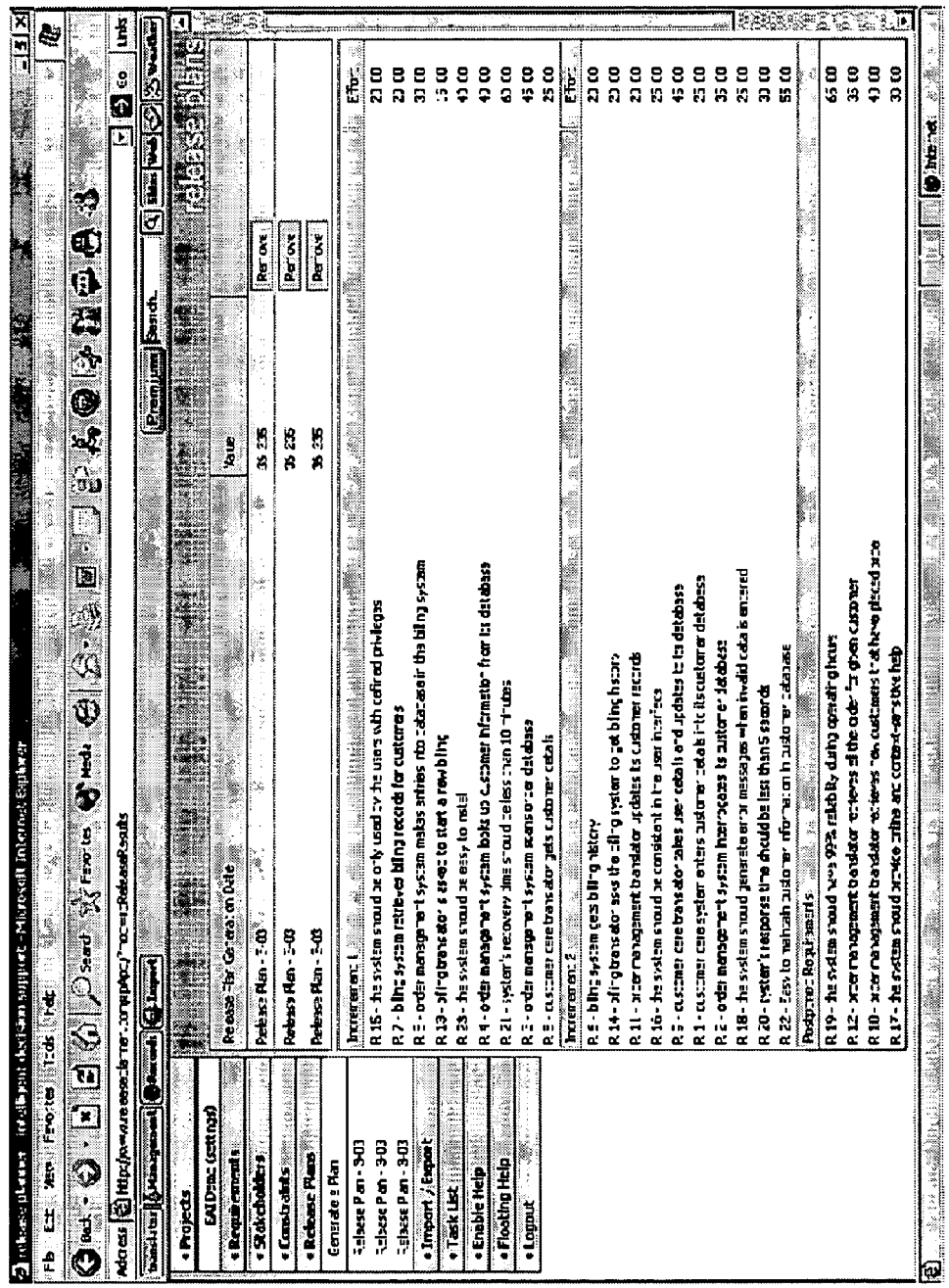
FIG. 18 is a screenshot of the layout of a generated plan.

In this example, we generated three different valid release plans. These plans provide intelligent guidance to the involved people on how to plan the application integration more efficiently and accurately. They may be analysed later in the step "Consolidation" and the most suitable solution will be chosen as the actual integration plan to follow. One of the generated plans is shown in FIG. 18.

In order to interpret the plan results, we take release plan 1 as the example. The requirements from the identified requirement set are assigned into different releases. For every release, the sum of effort of every requirement in that release is no great than the maximum effort available for that release. Nine requirements are assigned into release one, taking 295 person-days' effort. Another ten requirements are in the release two with the total effort of 300 person-days. Four requirements are postponed to implement. Within every release, both functional and non-functional requirements are assigned to make sure the Also, the release planning results conform t0o the requirement dependencies identified in the previous step, modeling. For example, we identified the coupling dependency between R 1 and R 22, and precedence dependency that R 9 must be implemented before R 1. We can see that the plan 1 follows these predefined constraints. What's more, this result takes account of the evaluation from different stakeholders who have different importance in making such evaluation. The higher the vote a requirement can get, the more likely that it can be implemented in the earlier releases.

Immaterial modifications may be made to the embodiments of the invention described here without departing from the invention.

TABLE 1

Results of the exploration and consolidation phases of iteration 1. The numbers represent a relative measure of the degree of satisfaction of all 15 solutions with respect to the three criteria.
5-best solutions from the 3 stakeholder perspectives

| Solution | 1 | 2 | 3 | 4 | 5 | 6 | 7 | 8 | 9 | 1 | 1 | 1 | 1 | 1 | 1 |
|---|---|---|---|---|---|---|---|---|---|---|---|---|---|---|---|
| $Sat^t$ | 74 | 74 | 7 | 7 | 7 | 7 | 7 | 7 | 7 | 7 | 7 | 7 | 7 | 7 | 7 |
| $Sat^b$ | 78 | 77 | 7 | 7 | 7 | 7 | 7 | 7 | 7 | 7 | 7 | 7 | 7 | 7 | 7 |
| $Sat^q$ | 81 | 82 | 8 | 7 | 7 | 8 | 8 | 7 | 8 | 8 | 8 | 8 | 8 | 8 | 8 |
| Struc | 8 | 9 | 7 | 9 | 9 | 9 | 7 | 7 | 8 | 8 | 8 | 8 | 7 | 7 | 7 |

TABLE 2

Analysis of solution set X and comparison of suggested and decided options during iteration 1 (U means uncertainty to make the decision at that stage).

| | First type of suggestions | | | | | Second type of suggestions | | | |
|---|---|---|---|---|---|---|---|---|---|
| Requirements | {29} | {21, 22, 28, 0} | {1, 2, 12, 13, 14} | {3, 4, 5, 6, 7, 17, 19, 23} | {24} | {8, 9, 18} | {10, 11, 16} | {26, 27} |
| Suggested | 1 | 1 | 2 | 3 | 3 | 1 | 2 | 3 |
| Decided | 3 | 1 | 2 | 3 | U | U | U | U |

TABLE 3

Results of the exploration and consolidation phases (iteration 2).
3-best solutions from the 3 stakeholder perspectives

| Solution | 1 | 2 | 3 | 4 | 5 | 6 | 7 | 8 | 9 |
|---|---|---|---|---|---|---|---|---|---|
| $Sat^t$ | 7 | 71 | 7 | 6 | 6 | 6 | 6 | 70 | 69 |
| $Sat^b$ | 6 | 69 | 7 | 7 | 7 | 7 | 7 | 74 | 69 |
| $Sat^q$ | 7 | 78 | 7 | 7 | 7 | 7 | 7 | 79 | 80 |
| Struc | 9 | 9 | 8 | 6 | 7 | 9 | 8 | 6 | 8 |

TABLE 4

Analysis of open decisions related to X and actual decisions made in iteration 2.

| | First | | Second type | | |
|---|---|---|---|---|---|
| Requirement | {8, 9} | {15, 16} | {18, 25, 26} | 20 | 27 |
| Suggested option | 1 | 2 | 1 | 1 | 1 |
| Decided option | 2 | U | U | 1 | 3 |

TABLE 5

Results of iteration 3.

| | Solution | Solution | Solution |
|---|---|---|---|
| $Sat^t$ | 67 | 67 | 66 |
| $Sat^b$ | 68 | 65 | 67 |
| $Sat^q$ | 76 | 74 | 75 |
| Stru | 9 | 10 | 9 |

What is claimed is:

1. A method executed by a central processing unit for release planning, the method comprising:
   assigning stakeholder priorities to a set of requirements, where the priorities are assigned by plural stakeholders;
   explicitly defining a set of constraints on the requirements; and
   generating a set of release plan solutions using algorithms carried out by the central processing unit for evaluation together, each release plan solution of the set of release plan solutions satisfying the constraints, balancing between stakeholder priorities of different stakeholders, and having a positive impact, measured by objective criteria, on at least one of project time, overall cost and quality;
   wherein the algorithms comprise one or more of genetic algorithms, heuristic algorithms and integer programming algorithms and use at least one objective function, which comprises an aggregation of stakeholder priorities or value estimates to evaluate said release plan solutions; and
   selecting at least one release plan solution from the set of candidate release plan solutions based on the positive impact of the at least one release plan solution.

2. The method of claim 1 in which generating is carried out repeatedly after changing one or more of the constraints, requirements, objective criteria, or stakeholder priorities.

3. The method of claim 2 in which changing comprises actions chosen from a group consisting of:
   adding additional requirements;
   removing existing requirements;
   modifying existing requirements; and
   adjusting stakeholder priorities.

4. The method of claim 2 further comprising assigning the requirements to one of the next release, the next but one release, or unassigned.

5. The method of claim 4 in which repeating the generation of a set of release plan solutions comprises using the unassigned requirements as the requirements in the next generation of a set of release plan solutions.

6. The method of claim 1 in which the set of constraints is chosen from a group consisting of precedence relationships between requirements, coupling relationships between requirements, effort, resource, budget, risk, and time.

7. The method of claim 1 in which stakeholder priorities are represented by a numerical value representing stakeholder satisfaction that a requirement be assigned to one of three categories, the categories consisting of the next release, the next but one release, and postponed.

8. The method of claim 1 in which the requirements are grouped into groups of requirements and the algorithms balance between stakeholder priorities assigned to the groups of requirements.

9. The method of claim 1 in which stakeholders prioritize subsets of the complete set of requirements.

10. The method of claim 1 where the set of release plan solutions generated are a set of maximally distinct alternative release plan solutions where for each plan the guaranteed degree of optimality is known.

11. A computer programmed to carry out the method of claim 1.

12. Non-transitory computer readable media containing instructions for a computer to carry out the method of claim 1.

13. The method of claim 1 in which the constraints comprise a measure of resource consumption.

14. The method of claim 1 in which computation of the algorithms is carried out externally from an application service provider, and stakeholder priorities are input to a computer from remote locations.

* * * * *